United States Patent
Subramaniam et al.

(10) Patent No.: US 9,257,097 B2
(45) Date of Patent: Feb. 9, 2016

(54) REMOTE RENDERING FOR EFFICIENT USE OF WIRELESS BANDWIDTH FOR WIRELESS DOCKING

(71) Applicant: QUALCOMM Incorporated, San Diego, CA (US)

(72) Inventors: Vijay Naicker Subramaniam, San Diego, CA (US); Fawad Shaukat, San Diego, CA (US); Tyler James Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/138,945

(22) Filed: Dec. 23, 2013

(65) Prior Publication Data

US 2015/0179143 A1 Jun. 25, 2015

(51) Int. Cl.
  *G09G 5/12* (2006.01)
  *G06F 3/14* (2006.01)
  *H04L 29/08* (2006.01)
  *H04L 29/06* (2006.01)

(52) U.S. Cl.
  CPC .............. *G09G 5/12* (2013.01); *G06F 3/1454* (2013.01); *H04L 65/604* (2013.01); *H04L 67/025* (2013.01); *G09G 2370/16* (2013.01)

(58) Field of Classification Search
  CPC ..................... H04N 21/43637; G09G 2370/16
  See application file for complete search history.

(56) References Cited

U.S. PATENT DOCUMENTS

| | | |
|---|---|---|
| 2003/0027517 A1 | 2/2003 | Callway et al. |
| 2006/0028399 A1 | 2/2006 | Glen et al. |
| 2007/0299778 A1* | 12/2007 | Haveson et al. ............. 705/51 |
| 2008/0303956 A1* | 12/2008 | Nakagawa ............. 348/723 |
| 2010/0164839 A1 | 7/2010 | Lyons et al. |
| 2011/0107388 A1 | 5/2011 | Lee et al. |
| 2012/0038654 A1 | 2/2012 | Wang et al. |
| 2012/0042275 A1 | 2/2012 | Neerudu et al. |
| 2013/0222210 A1 | 8/2013 | Wang et al. |

OTHER PUBLICATIONS

ISA/EPO, International Search Report and Written Opinion of the International Searching Authority, Int'l App. No. PCT/US2014/069809, Mar. 12, 2015, European Patent Office, Rijswijk, NL, 13 pgs.

* cited by examiner

*Primary Examiner* — Gerald Johnson
(74) *Attorney, Agent, or Firm* — Holland & Hart LLP

(57) ABSTRACT

Methods, systems, and devices are described for remote display of content in a wireless network. A source device capable of displaying content may identify one or more rendering instructions for content to be displayed remotely on a sink device. The source device may transmit the one or more rendering instructions to the sink device via a wireless peer-to-peer connection. The sink device may receive the one or more rendering instructions and may execute the one or more rendering instructions to render a display of at least part of the content. Further, the source device may receive data from the sink device via the wireless peer-to-peer connection. The identifying of the one or more rendering instructions by the source device may thus include identifying at least one rendering instruction based at least in part on the received data.

30 Claims, 18 Drawing Sheets

REMOTE RENDERING FOR EFFICIENT USE OF WIRELESS BANDWIDTH FOR WIRELESS DOCKING

BACKGROUND

The following relates generally to wireless communication, and more specifically to Wi-Fi peer-to-peer remote display. Wireless communications systems are widely deployed to provide various types of communication content such as voice, video, packet data, messaging, broadcast, and so on. These systems may be wireless local area network (WLAN), also known as Wi-Fi systems which utilize carrier sense multiple access with collision avoidance (CSMA/CA) mechanisms to access a wireless medium. These systems may also be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a peer-to-peer network allows wireless devices to directly communicate with each other. Devices within range of each other may discover and communicate directly without involving central access points. Wi-Fi peer-to-peer connections allow portable devices or computers to transmit video and audio to a compatible display wirelessly. The device that transmits the video and audio may be referred to as a source device. The compatible display (or device to be connected to a display) may be referred to as a sink device.

Various approaches have been considered for remote rendering of a mobile device's display, either on a monitor with a certain operating system or a monitor with no operating system. For example, Miracast 1.0 allows for wirelessly displaying video between devices over a Wi-Fi network. In general, content is compressed at the source device (e.g., cellular phone, tablet, etc.), packetized and transmitted to the sink device (e.g., PC, monitor, etc.). The sink device receives the packetized information, and then decompresses and displays the content.

For acceptable rendering, a high quality video codec standard, such as an H.264 CODEC, may be used. However, pixel domain compression using an H.264 CODEC in Miracast results in a relatively high power consumption, a relatively high wireless bandwidth requirement, and relatively low quality graphics and text. Further, increasing requirements for higher resolution content/display and display refresh rate are pushing the limits of the radio capabilities of 802.11 ac and 802.11 ad protocols.

SUMMARY

The described features generally relate to one or more improved systems, methods, and/or apparatuses for improving remote rendering for efficient use of wireless bandwidth. In general, the approach is to send video as encoded content (e.g., streaming) and to send rendering instructions (e.g., HTML, XML, OPENGL, JAVA, etc.) so that the sink device may render at least part of the display itself. Pre-built resources (e.g., textures) may be sent to the sink device upon startup of an application. The resources may then be overlayed and text may be rendered at the sink side "on demand."

The source device may identify rendering instructions in content to be displayed on the sink device. The source device may send the identified rendering instructions directly to the sink device. The source device may also send coded video and/or coded resources to the sink device. On the sink side, the sink device may receive the rendering instructions, and then may execute the instructions to render the display content. The sink device may decode the video and/or resources, and then may combine the video and/or resources with the rendered display content to obtain the display for output at the sink device (e.g., frame buffer to monitor).

This approach may use wireless bandwidth more efficiently by not requiring compression of content rendered at the source side and decompression thereof at the sink side. In particular, this approach may lower power consumption for the source device, which relies on one or more batteries. Further, this approach may provide a latency of only one frame delay.

The sink device may render high quality graphics and text "on demand." Also, the resources provided to the sink device may be used "on demand," and may be easily updated by the source device sending resource updates. User interface content may be updated based on user interaction, typically at a relatively slow rate, such as user input of one or two clicks per second. Areas of a display updated based on user interaction may often frequently be relatively small, such as a cursor that is moved in the display. Similarly, only small areas of a display may be updated with text in response to user input (e.g., typing or voice-to-text). Further, backgrounds may be static (unless animated). Thus, graphics and text may be rendered easily on the sink side.

A method performed by a source device for remote display of content by a sink device in a wireless network is described. In one configuration, the method may involve identifying, at a source device capable of displaying content, one or more rendering instructions for content to be displayed remotely on a sink device. The one or more rendering instructions may be transmitted to the sink device via a wireless peer-to-peer connection for execution by the sink device to render a display of at least part of the content.

In some embodiments, the method may involve receiving data at the source device from the sink device via the wireless peer-to-peer connection. In such embodiments, the identifying of the one or more rendering instructions may involve identifying at least one rendering instruction based at least in part on the received data. Further, at least part of the received data may correspond to user input at the sink device.

In some embodiments, the method may involve running an application on the source device. In such embodiments, at least one of the one or more rendering instructions may be configured to render at least part of a user interface of the application upon execution. The method further may involve receiving data at the source device from the sink device via the wireless peer-to-peer connection. The identifying of the one or more rendering instructions may involve identifying at least one rendering instruction based at least in part on the received data. Also, at least part of the received data may correspond to user input for the application at the sink device.

In some embodiments, at least one of the one or more rendering instructions may be configured to render at least part of a user interface of the source device upon execution. In such embodiments, the method may involve receiving data at the source device from the sink device via the wireless peer-to-peer connection. The identifying of the one or more rendering instructions may involve identifying at least one rendering instruction based at least in part on the received data. At least part of the received data may correspond to user input at the sink device in accordance with the user interface of the source device.

In some embodiments, the method may involve identifying at least one graphics resource in the content. The at least one graphics resource may be compressed and may be transmitted to the sink device. At least one of the one or more rendering instructions may be configured to include the at least one graphics resource in the content displayed upon execution.

In some embodiments, the method may involve identifying at least one video stream in the content. The at least one video stream may be compresses and may be transmitted to the sink device. At least one of the one or more rendering instructions may be configured to include the at least one video stream in the content displayed upon execution.

An apparatus configured to enable remote display of content by a sink device in a wireless network is described. In one configuration, the apparatus may include means for identifying, at a source device capable of displaying content, one or more rendering instructions for content to be displayed remotely on a sink device. The apparatus also my include means for transmitting the one or more rendering instructions to the sink device via a wireless peer-to-peer connection for execution by the sink device to render a display of at least part of the content. Further, the apparatus may include means for performing one or more of the additional functions described herein.

A source device for remote display of content by a sink device in a wireless network is described. In one configuration, the source device may include: a processor; memory in electronic communication with the processor; and, instructions stored in the memory. The instructions may be executable by the processor to: identify, at a source device capable of displaying content, one or more rendering instructions for content to be displayed remotely on a sink device; and, transmit the one or more rendering instructions to the sink device via a wireless peer-to-peer connection for execution by the sink device to render a display of at least part of the content. Further, the instructions may be executable by the processor to perform one or more of the additional functions described herein.

A method performed by a sink device for remote display of content of a source device in a wireless network is described. In one configuration, the method may involve: receiving, via a wireless peer-to-peer connection direct from a source device capable of displaying content, one or more rendering instructions for content to be displayed; and, executing the one or more rendering instructions to render a display of at least part of the content. In some embodiments, the method may involve transmitting data to the source device via the wireless peer-to-peer connection. In such embodiments, at least one of the one or more rendering instructions received may be based at least in part on the transmitted data. Also, the method may involve receiving user input at the sink device. In such embodiments, at least part of the data transmitted to the source device may correspond to the received user input. Further, the method may involve performing one or more of the additional functions described herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
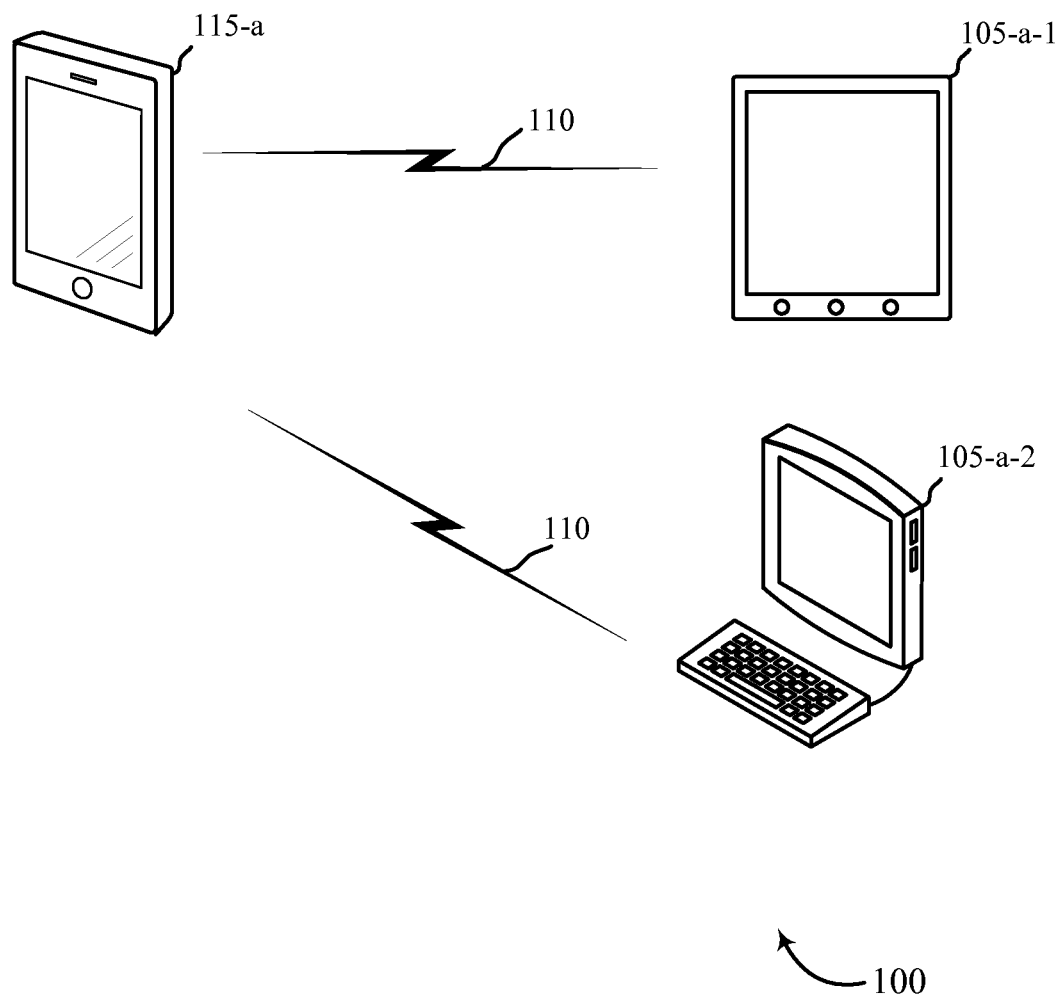
FIG. 1 shows a block diagram of a wireless communications system.

Communications between a source device and a sink device connected via a wireless peer-to-peer connection may be performed to remotely render content of the source device at the sink device. Wi-Fi remote display includes, but is not limited to the Wi-Fi Display specification, also known as Miracast®, Discovery and Launch (DIAL), Digital Living Network Alliance® (DLNA), Airplay, WirelessHD, Wireless Home Digital Interface (WHDI), Intel's Wireless Display (Wi-Di) technology, and Ultra-wideband (UWB) connections. It may allow a portable device or computer to transmit content (e.g., video, audio, images, etc.) to a compatible device wirelessly. It may enable delivery of compressed standard or high-definition video over a peer-to-peer wireless link. It also may allow users to echo the display from one device onto the display of another device. The wireless peer-to-peer connection for remote display may utilize a Wi-Fi Peer-to-Peer (P2P) link between two Wi-Fi peer-to-peer devices. This may also be referred to as a Wi-Fi Direct connection. In another example, the connection may be established by using a Wi-Fi Tunneled Direct Link Setup (TDLS) link.

Remote rendering of a mobile device's display as described herein should be distinguished from Web browser technology in general. Web browser technology may be considered to be a form of remote rendering that works over a multi-hop network. On the contrary, remote rendering in the context of this disclosure should be understood as involving Wi-Fi direct (point-to-point connection) that operates as a single hop network.

In one example, a source device (e.g., a smartphone) may receive or otherwise obtain content that a user wishes to have displayed on a sink device (e.g., a tablet or a PC). The source device may identify rendering instructions in the content and may send the identified rendering instructions directly to the sink device. The source device may also send coded video and/or coded resources to the sink device. The sink device may receive the rendering instructions, and then may execute the instructions to render the content for display. The sink device may decode the video and/or resources, and may combine the video and/or resources with the rendered content to obtain a display of the content for output at the sink device (e.g., frame buffer to display screen or monitor).

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

Referring first to FIG. 1, a system 100 includes various source devices 115 and various sink devices 105. Each of these components may be in communication with each other, directly or indirectly. Examples of the source devices 115 may include, but are not limited to, smartphones, cell phones, tablets, personal digital assistants (PDAs), laptops, or any other devices capable of communicating with a sink device via a Wi-Fi connection. Examples of the sink devices 105 may include, but are not limited to, in-vehicle infotainment devices, TVs, computers, laptops, projectors, cameras, smartphones, or any other devices capable of displaying content received from a source device and communicating with a source device via a Wi-Fi connection.

In one embodiment, a source device 115-a may be connected to one or more sink devices, such as a first sink device 105-a-1 and a second sink device 105-a-2. The source device 115-a and the one or more sink devices 105 may be connected via a Wi-Fi peer-to-peer connection. The Wi-Fi connection may allow the source device 115-a to transmit data to the one or more sink devices 105 via a link 110. The data transmitted from the source device 115-a may be displayed by the sink device 105. In addition to images, the source device 115-a may transmit video and/or audio streams to the sink devices 105 via the link 110. The sink devices 105 may process the received video and/or audio streams to render the content thereof via a display and/or speakers.

In one configuration, the Wi-Fi connection may also allow the sink devices 105 to transmit data to the source device 115-a via the link 110. The data transmitted from the sink devices 105 may be used by the source device 115-a to control various functions of the source device 115-a and/or one or more applications on the source device 115-a. The data transmitted from the sink devices 105 may also be used by the source device 115-a to determine (e.g., update) rendering instructions and/or other features of the content to be displayed by the respective sink device 105. For example, the sink devices 105 may include various input controls (e.g., mouse, keyboard, touch screen, knobs, keys, user interface buttons). These controls may be used at the sink devices 105 to interact with the source device 115-a and/or initialize and interact with applications stored on the source device 115-a. In some embodiments, the content to be displayed at the sink devices 105 may be at least part of a user interface of the source device 115-a and/or a user interface of the application(s) running on the source device 115-a for the respective sink devices 105.

The link 110 between the source device 115-a and a sink device 105 may be bi-directional. As discussed above, the wireless peer-to-peer connection for remote display may utilize a Wi-Fi P2P link, a Wi-Fi Direct connection or a Wi-Fi TDLS link. The Wi-Fi devices in these examples may use the WLAN radio and baseband including physical and MAC layers from IEEE 802.11, and its various versions including, but not limited to, 802.11b, 802.11g, 802.11a, 802.11n, 802.11ac, 802.11ad, 802.11ah, etc.

Although not illustrated in FIG. 1, the first sink device 105-a-1 and/or the second sink device 105-a-2 may communicate with additional source devices via Wi-Fi connection(s). In one embodiment, the sink devices 105 may be connected with another second source device (not shown) via a Wi-Fi peer-to-peer connection. The sink devices 105 may be connected simultaneously or at a different time than the connection between the sink devices and the source device 115-a.

Figure 2:
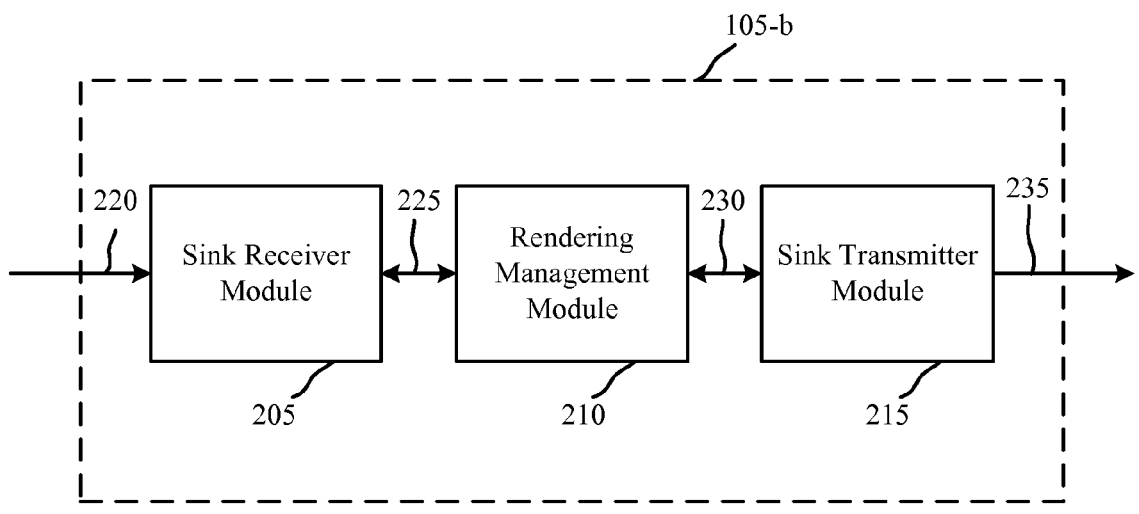
FIG. 2 is a block diagram illustrating a sink device in accordance with various embodiments.

Referring now to FIG. 2, a block diagram 200 illustrates a sink device 105-b in accordance with various embodiments. The sink device 105-b may be an example of one or more aspects of one of the sink devices 105 described with reference to FIG. 1. The device 105-b may also be a processor. The device 105-b may include a sink receiver module 205, a rendering management module 210, and a sink transmitter module 215. Each of these components may be in communication with each other.

The components of the sink device 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The sink receiver module 205 may receive communications from one or more source devices, such as the source devices 115 described with reference to FIG. 1, via one or more signals 220. As described herein, the communications may include audio and/or video streams, graphics resources, and/or rendering instructions. The sink receiver module 205 may receive these communications via a wireless (e.g., Wi-Fi) peer-to-peer connection that is established between the sink device 105-*b* and the one or more source devices 115. The rendering management module 210 may manage such communications received by the sink device 105-*b* via one or more signals 225. Additionally, the rendering management module 210 may manage, via one or more signals 230, communications transmitted from the sink device 105-*b* to the source device(s). As described herein, these communications may include data representing user input at the sink device 105-*b* for interacting with the source device(s) 115 and/or one or more applications running on the source device(s) 115. The sink transmitter module 215 may transmit such data from the sink device 105-*b* via the Wi-Fi connection, via one or more signals 235. Further details regarding the rendering management module 210 will be described below.

Figure 3:
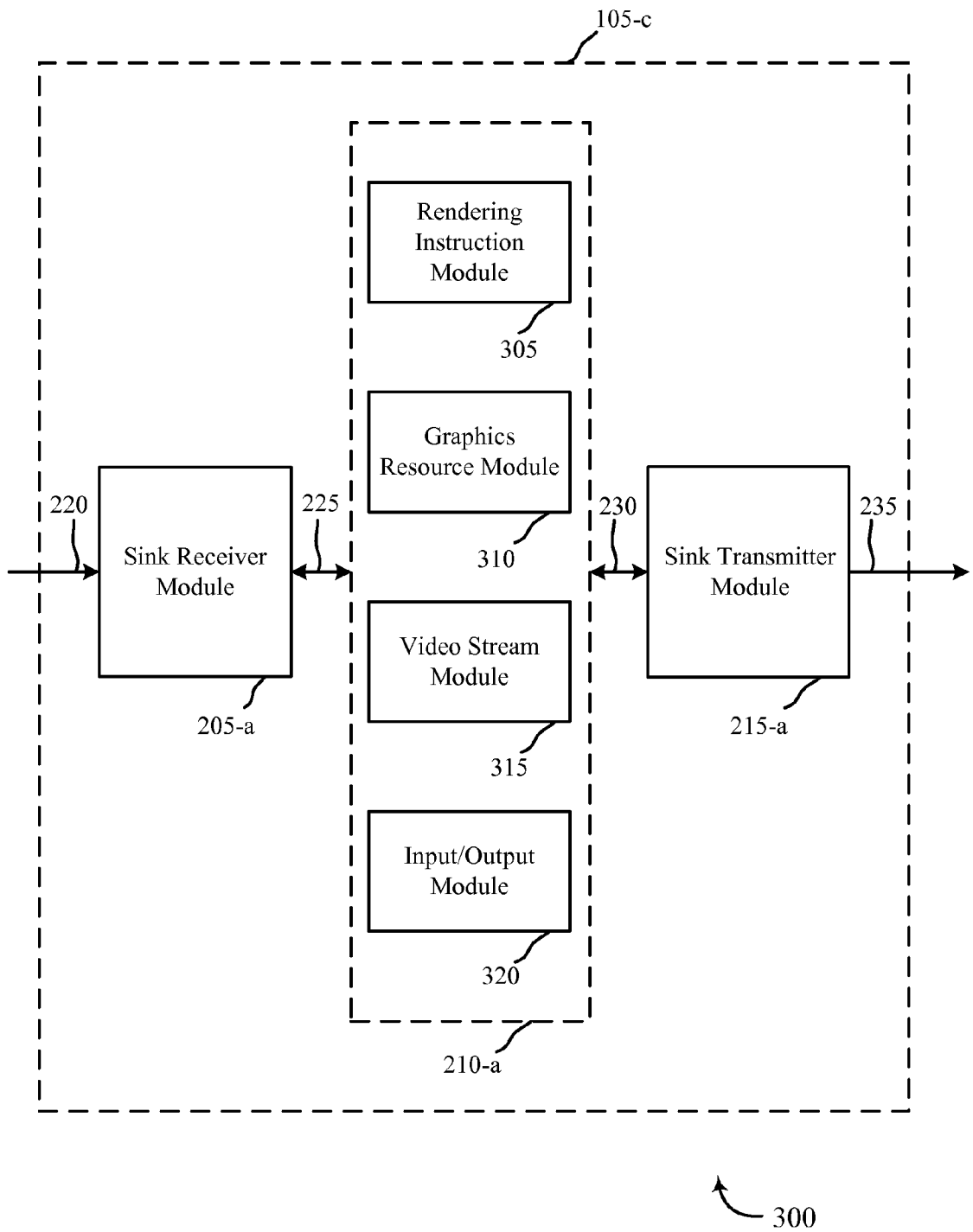
FIG. 3 is a block diagram illustrating another embodiment of the sink device.

FIG. 3 is a block diagram 300 illustrating a sink device 105-*c* in accordance with various embodiments. The sink device 105-*c* may be an example of one or more aspects of one of the sink devices 105 described with reference to FIGS. 1 and/or 2. The device 105-*c* may also be a processor. The device 105-*c* may include a sink receiver module 205-*a*, a rendering management module 210-*a*, and a sink transmitter module 215-*a*. Each of these components may be in communication with each other.

The components of the device 105-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The sink receiver module 205-*a* and the sink transmitter module 215-*a* may be configured as previously described with reference to FIG. 2. The rendering management module 210-*a* may include a rendering instruction module 305, a graphics resource module 310, a video stream module 315, and an input/output module 320.

The rendering management module 210-*a* may be configured to perform the various functions described above with respect to FIG. 2. In this example, the rendering instruction module 305 may process and/or execute rendering instructions received by the sink device 105-*c* to render content for display. The sink device 105-*c*, the rendering management module 210-*a* or the rendering instruction module 305 may include a processor for performing such functionality.

The graphics resource module 310 may store graphics resources received by the sink device 105-*c* via signal(s) 220, and may be configured to provide one or more graphics resources for display, for example, in accordance with one or more of the rendering instructions received by the sink device 105-*c*. The video stream module 315 may process one or more video streams received by the sink device 105-*c* via signal(s) 220. For example, the video stream module 315 may decompress and/or decode video stream(s) for display. In some embodiments, this may be in accordance with one or more of the rendering instructions received by the sink device 105-*c*.

Although not shown, the rendering management module 210-*a* may also include an audio stream module for processing audio streams, or the video stream module 315 may be implemented as an audio/video stream module to process both audio and video streams. The input/output module 320 may process user input received at the sink device 105-*c* and may generate data for output to one or more source devices based at least in part on the user input. The data may be transmitted by the sink transmitter module 215-*a* via signal(s) 235 to the one or more source devices 115 to interact with the source device(s) 115 and/or with an application on the source device(s) 115.

Figure 4:
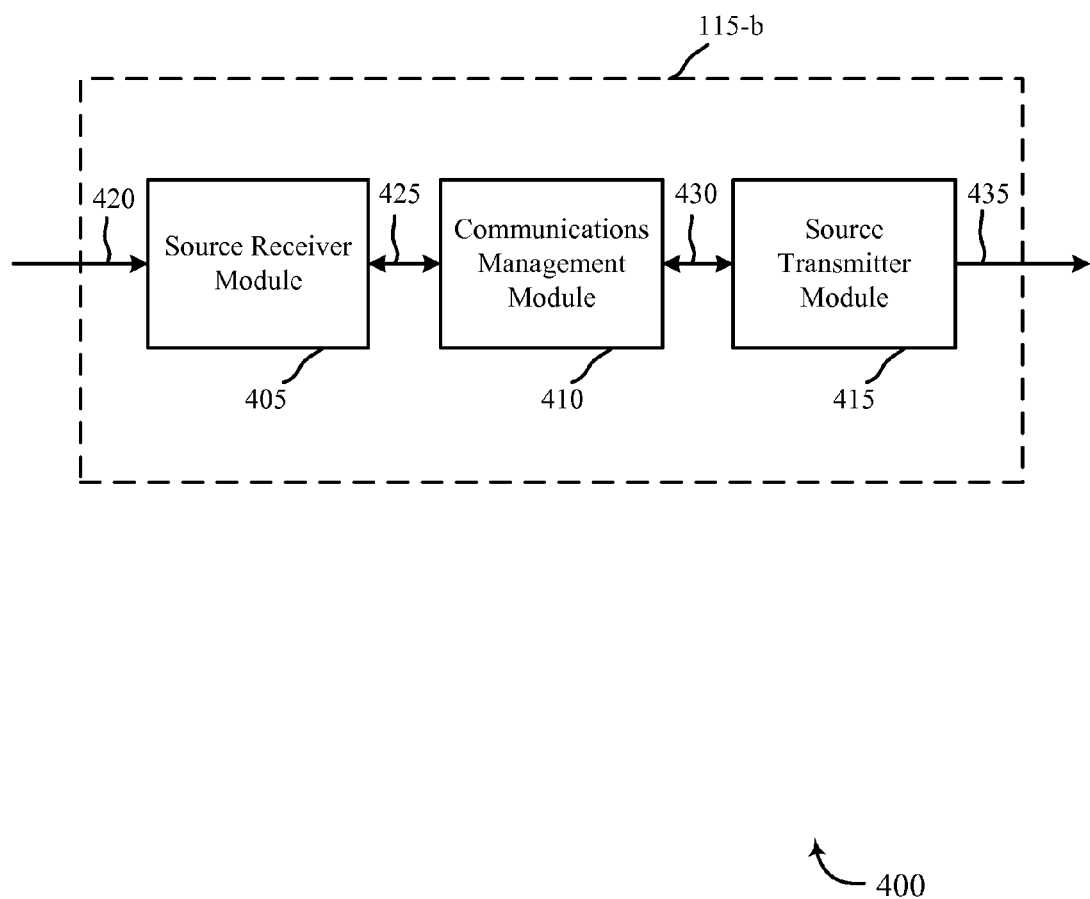
FIG. 4 is a block diagram illustrating a source device in accordance with various embodiments.

FIG. 4 is a block diagram 400 illustrating a source device 115-*b* in accordance with various embodiments. The source device 115-*b* may be an example of one or more aspects of one of the source devices 115 described with reference to FIG. 1. The source device 115-*b* may also be a processor. The source device 115-*b* may include a source receiver module 405, a communications management module 410, and a source transmitter module 415. Each of these components may be in communication with each other.

The components of the source device 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source receiver module 405 may receive communications from a sink device, such as one or more of the sink devices 105 described with reference to FIGS. 1, 2 and/or 3, via one or more signals 420. The received communications may be any suitable form of data. The source receiver module 405 may receive these communications via a wireless (e.g., Wi-Fi) peer-to-peer connection that is established between the source device 115-*b* and the sink device 105. The communications management module 410 may manage such communications received by the source device 115-*b* via one or more signals 425. Additionally, the communications management module 410 may manage, via one or more signals 430, communications transmitted from the source device 115-*b* to the sink device(s). Further, the communications management module 410 may process the data to control or otherwise manage aspects of the source device 115-*b* for providing audio and/or video streams, graphics resources, and/or rendering instructions to one or more sink devices 105.

The source transmitter module 415 may transmit communications to a sink device, such as one or more of the sink devices 105 described with reference to FIGS. 1, 2 and/or 3, via one or more signals 435. The transmitted communications may include data such as graphics resources, audio and/or video streams, and/or rendering instructions. The source transmitter module 415 may transmit these communications via a wireless (e.g., Wi-Fi) peer-to-peer connection that is established between the source device 115-*b* and the sink device 105. Details regarding the communications management module 410 will be described below.

Figure 5:
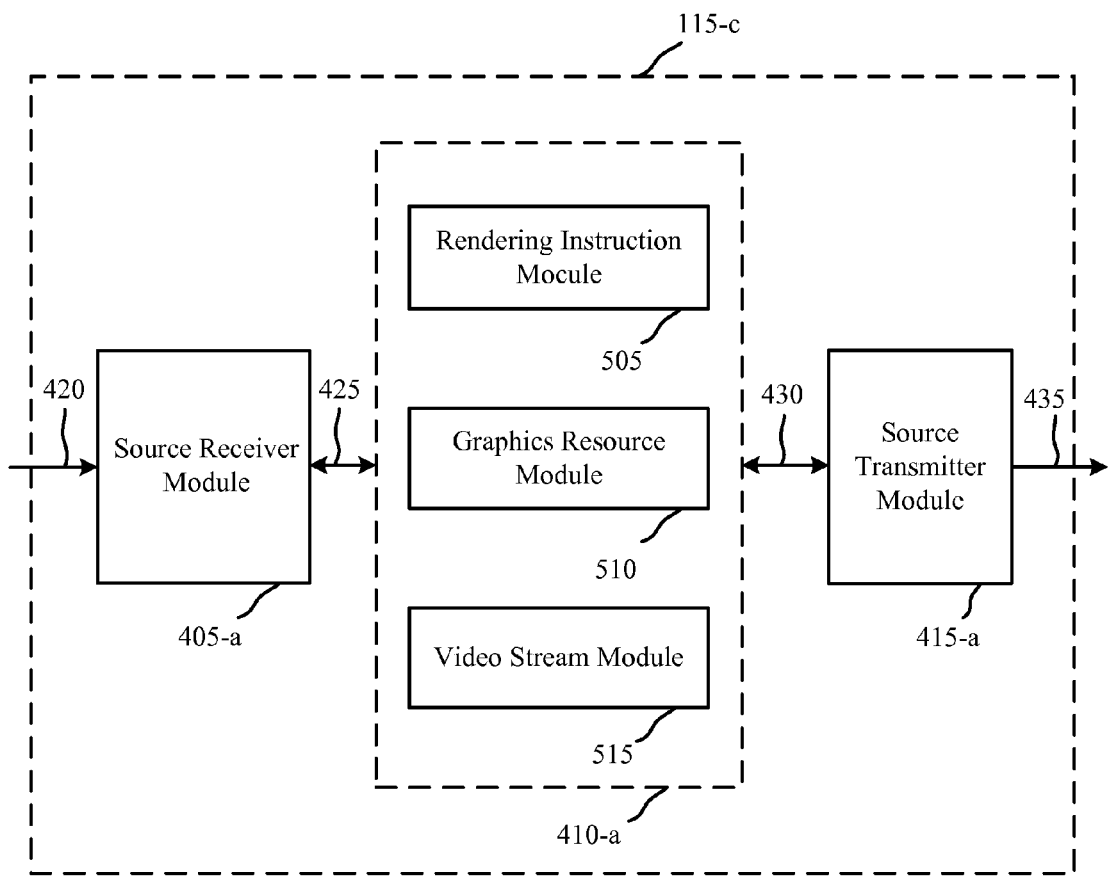
FIG. 5 is a block diagram illustrating another embodiment of the source device.

FIG. 5 is a block diagram 500 illustrating a source device 115-*c* in accordance with various embodiments. The source device 115-*c* may be an example of one or more aspects of one of the source devices 115 described with reference to FIGS. 1 and/or 4. The device 115-c may also be a processor. The device 115-c may include a source receiver module 405-a, a communications management module 410-a, and a source transmitter module 415-a. Each of these components may be in communication with each other.

The components of the device 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source transmitter module 415-a may be configured as previously described with respect to FIG. 4. The source receiver module 405-a may also be configured as previously described with respect to FIG. 4. The communications management module 410-a may include a rendering instruction module 505, a graphics resource module 510, and a video stream module 515.

In one embodiment, the rendering instruction module 505 may process content to be displayed to obtain rendering instructions. The rendering instructions may be executed for display at the source device 115-c and may be transmitted by the source transmitter module 415-a via signal(s) 435 to one or more sink devices 105. In one example, the communications management module 410-a or the rendering instruction module 505 may separate or otherwise obtain rendering instructions from content received by the source device 115-c via signal(s) 420. In another example, the communications management module 410-a or the rendering instruction module 505 may separate or otherwise obtain rendering instructions from content stored or generated by the source device 115-c.

In one embodiment, the graphics resource module 510 may process content to be displayed to obtain one or more graphics resources. The graphics resource(s) may be included in the display at the source device 115-c (e.g., in accordance with one or more executed rendering instructions) and may be transmitted by the source transmitter module 415-a via signal (s) 435 to one or more sink devices 105. In one example, the communications management module 410-a or the graphics resource module 510 may separate or otherwise obtain graphics resources from content received by the source device 115-c via signal(s) 420. In another example, the communications management module 410-a or the graphics resources module 510 may separate or otherwise obtain graphics resources from content stored or generated by the source device 115-c.

In one embodiment, the video stream module 515 may process content to be displayed to obtain one or more video streams. The video stream(s) may be included in the display at the source device 115-c (e.g., in accordance with one or more executed rendering instructions) and may be transmitted by the source transmitter module 415-a to one or more sink devices 105 via signal(s) 435. In one example, the communications management module 410-a or the video stream module 515 may separate or otherwise obtain video streams from content received by the source device 115-c via signal(s) 420. In another example, the communications management module 410-a or the video stream module 515 may separate or otherwise obtain video streams from content stored or generated by the source device 115-c. Although not shown, the communications management module 410-a may also include an audio stream module for processing audio streams, or the video stream module 515 may be implemented as an audio/video stream module to process both audio and video streams.

The source receiver module 405-a may receive data from the sink device(s) 105 via a wireless (e.g., Wi-Fi) peer-to-peer connection that is established between the source device 115-c and the sink device(s) 105. The communications management module 410-a may process the received data to control or otherwise manage the video stream module 515, the graphics resource module 510, and the rendering instruction module 505 for respectively providing the video streams, the graphics resources, and/or the rendering instructions to the one or more sink devices 105.

Figure 6:
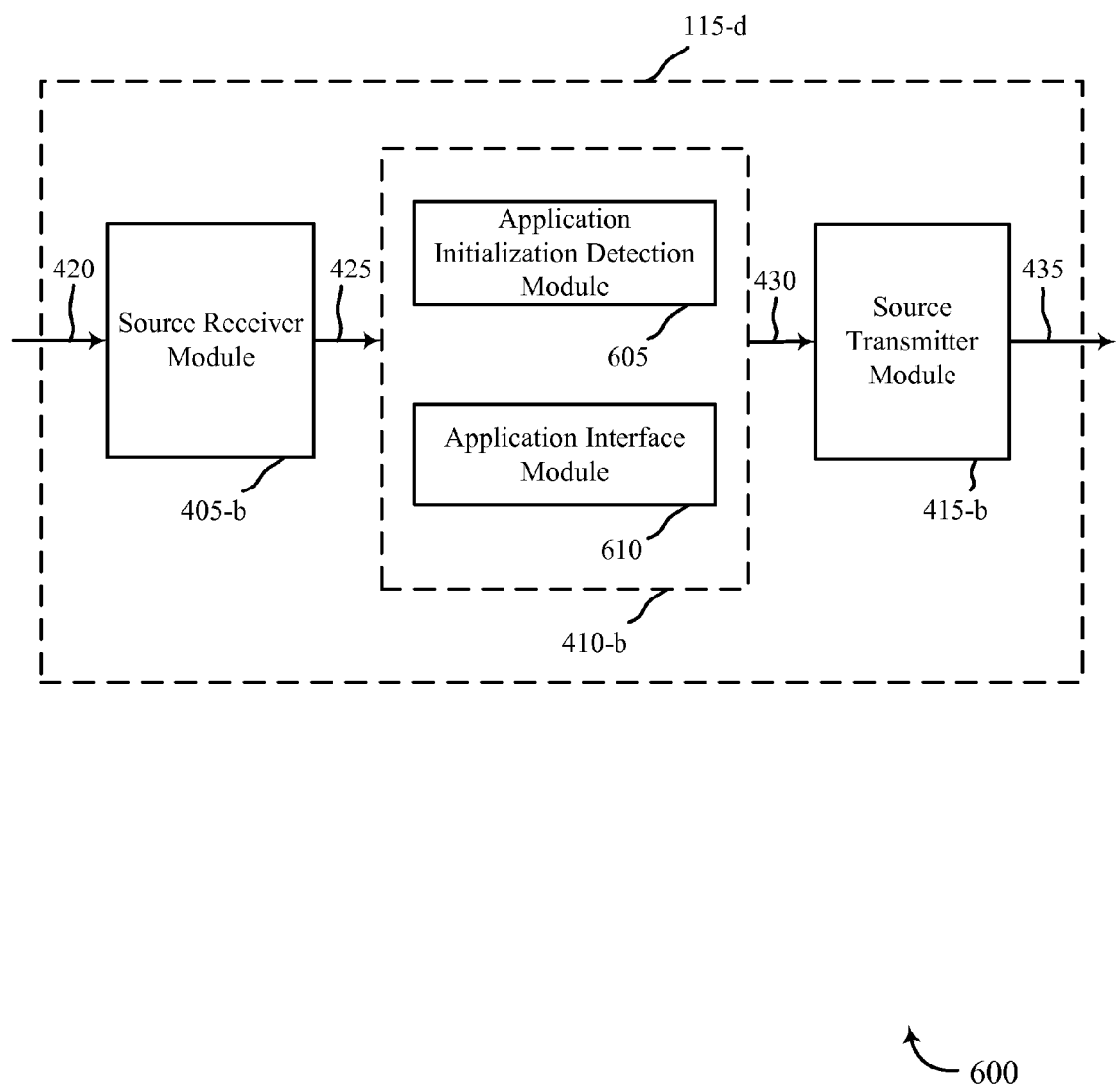
FIG. 6 is a block diagram illustrating a further embodiment of the source device.

FIG. 6 is a block diagram 600 illustrating a source device 115-d in accordance with various embodiments. The source device 115-d may be an example of one or more aspects of one of the source devices 115 described with reference to FIGS. 1, 4, and/or 5. The source device 115-d may also be a processor. The source device 115-d may include a source receiver module 405-b, a communications management module 410-b, and a source transmitter module 415-b. Each of these components may be in communication with each other.

The components of the device 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by one or more general or application-specific processors.

The source receiver module 405-b and the source transmitter module 415-b may be configured as previously described with respect to FIGS. 4 and/or 5. In one configuration, the communications management module 410-b may include an application initialization detection module 605 and an application interface module 610.

In one embodiment, the application initialization detection module 605 may detect or otherwise determine that an application is initialized or launched on the source device 115-d. The initialization/launch of the application may be based on user input received at the source device 115-d. Additionally or alternatively, the initialization/launch of the application may be based on user input received at the sink device(s) 105 and data representing such user input received by the source receiver module 405-b via signal(s) 420. The source receiver module 405-b may receive this data via a wireless (e.g., Wi-Fi) peer-to-peer connection that is established between the source device 115-d and the sink device(s) 105.

In one embodiment, the application interface module 610 may identify or otherwise determine video and/or audio streams, graphics resources, and/or rendering instructions for providing a display of a user interface for one or more initialized (e.g., running) applications on the source device 115-d. Additionally or alternatively, the application interface module 610 may identify or otherwise determine such data to be transmitted to the sink device(s) for rendering a display of at least part of the interface for one or more initialized applications on the sink device(s) 105. The source transmitter module 415-*b* may transmit such data via the Wi-Fi connection, via signal(s) 435.

The application interface module 610 may also process data representing user input received at the sink device(s) 105 in accordance with the display of the one or more application user interfaces on the sink device(s) 105. The source receiver module 405-*b* may receive this data via the Wi-Fi connection. The application interface module 610 may provide instructions to the one or more applications using the data. Such instructions may control the application(s) on the source device 115-*d*, and also may update the data transmitted to the sink device(s) 105 for remote display.

Figure 7:
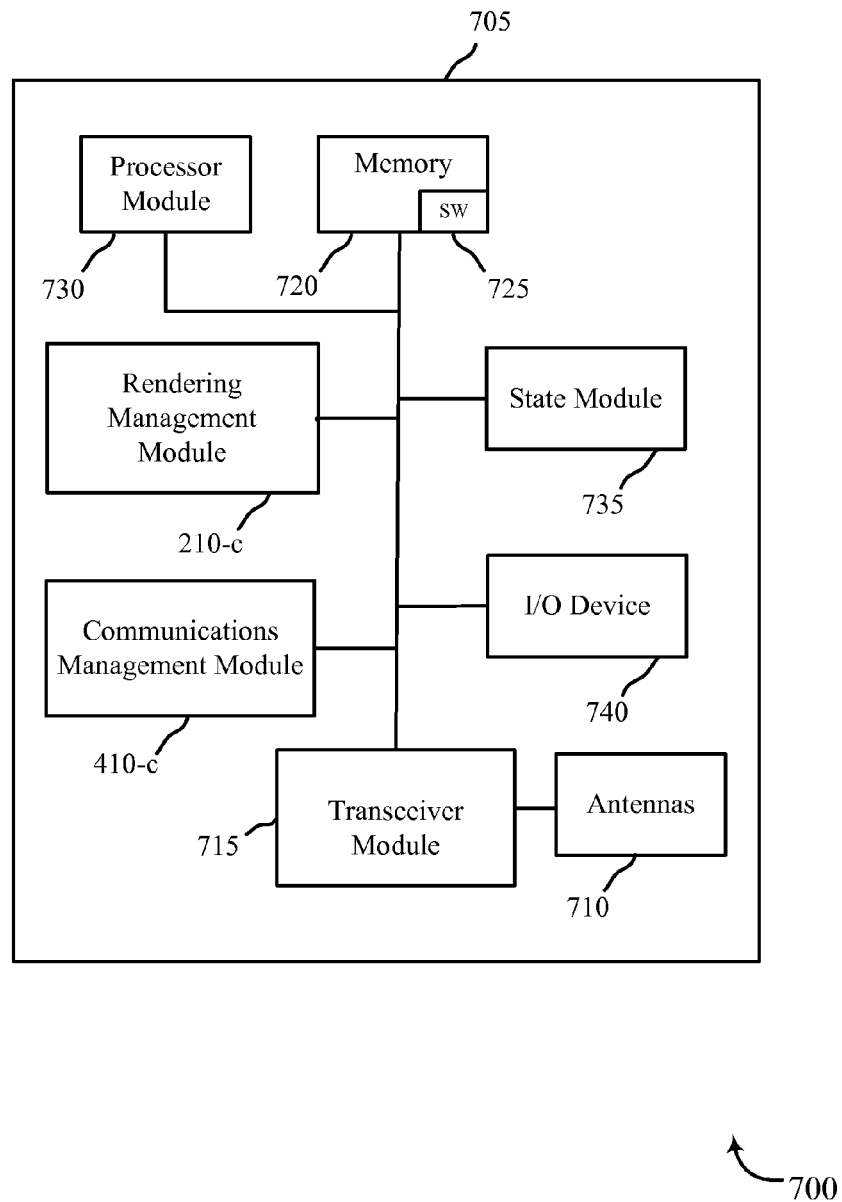
FIG. 7 is a block diagram of one configuration of a sink/source device.

FIG. 7 is a block diagram 700 illustrating a device 705 according to various embodiments. The device 705 may operate as either a source device or as a sink device as described herein, depending on actual use of the device 705. As a result, the device 705 may be configured to participate in Wi-Fi direct communications with other wireless devices (e.g., via a Wi-Fi peer-to-peer connection) to provide content for remote rendering by another device and/or to receive data for rendering content from another device and remotely render the content using the received data. Thus, the device 705 may be the sink device 105 and/or the source device 115 of FIGS. 1, 2, 3, 4, 5 and/or 6, respectively. The device 705 may have any of various configurations, such as in-vehicle infotainment devices, digital televisions, personal computers (e.g., laptop computers, netbook computers, tablet computers, etc.), cellular telephones, PDAs, digital video recorders (DVRs), internet appliances, gaming consoles, e-readers, etc. The device 705 may have an internal power supply (not shown), such as a small battery, to facilitate mobile operation.

The device 705 includes antennas 710, a transceiver module 715, memory 720, and a processor module 730, which each may be in communication, directly or indirectly, with each other (e.g., via one or more buses). The transceiver module 715 is configured to communicate bi-directionally, via the antennas 710, as described above. For example, the transceiver module 715 may be configured to communicate bi-directionally with other devices 105/115 of FIGS. 1, 2, 3, 4, 5 and/or 6. The transceiver module 715 may include the receiver module 205/405 and the transmitter module 215/415 of FIGS. 2, 3, 4, 5 and/or 6, as previously described. In one embodiment, the transceiver module 715 may further include a modem configured to modulate packets and provide the modulated packets to the antennas 710 for transmission, and to demodulate packets received from the antennas 710. While the device 705 may include a single antenna, the device 705 will typically include multiple antennas 705 for multiple links.

The memory 720 may include random access memory (RAM) and read-only memory (ROM). The memory 720 may store computer-readable, computer-executable software code 725 containing instructions that are configured to, when executed, cause the processor module 730 to perform various functions described herein (e.g., identify/determine/obtain audio and/or video streams, graphics resources, and/or rendering instructions, receive, transmit, etc.). Alternatively, the software 725 may not be directly executable by the processor module 730 but be configured to cause the computer (e.g., when compiled and executed) to perform functions described herein.

The processor module 730 may include an intelligent hardware device, e.g., a central processing unit (CPU), a microcontroller, an application specific integrated circuit (ASIC), etc. The processor module 730 may include a speech encoder (not shown) configured to receive audio via a microphone, convert the audio into packets (e.g., 30 ms in length) representative of the received audio, provide the audio packets to the transceiver module 715, and provide indications of whether a user is speaking. Alternatively, an encoder may only provide packets to the transceiver module 715, with the provision or withholding/suppression of the packet itself providing the indication of whether a user is speaking.

According to the architecture of FIG. 7, the device 705 may further include a rendering management module 210-*c*, a communications management module 410-*c* and a state module 735. The rendering management module 210-*c* may be a component of the device 705 in communication with some or all of the other components of the device 705 via a bus. Alternatively, functionality of the rendering management module 210-*c* may be implemented as a component of the transceiver module 715, as a computer program product, and/or as one or more controller elements of the processor module 730. Likewise, the communications management module 410-*c* may be a component of the device 705 in communication with some or all of the other components of the device 705 via a bus. Alternatively, functionality of the communications management module 410-*c* may be implemented as a component of the transceiver module 715, as a computer program product, and/or as one or more controller elements of the processor module 730.

The state module 735 may reflect and control the current device state. The device 705 may further include one or more input/output (I/O) devices 740. These may include keyboards, touch screens, mice, microphones, speakers, a display, etc. The I/O device(s) 740 may provide various functionality described herein, in addition to conventional input/output for the device 705.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 705 as described herein.

Figure 8:
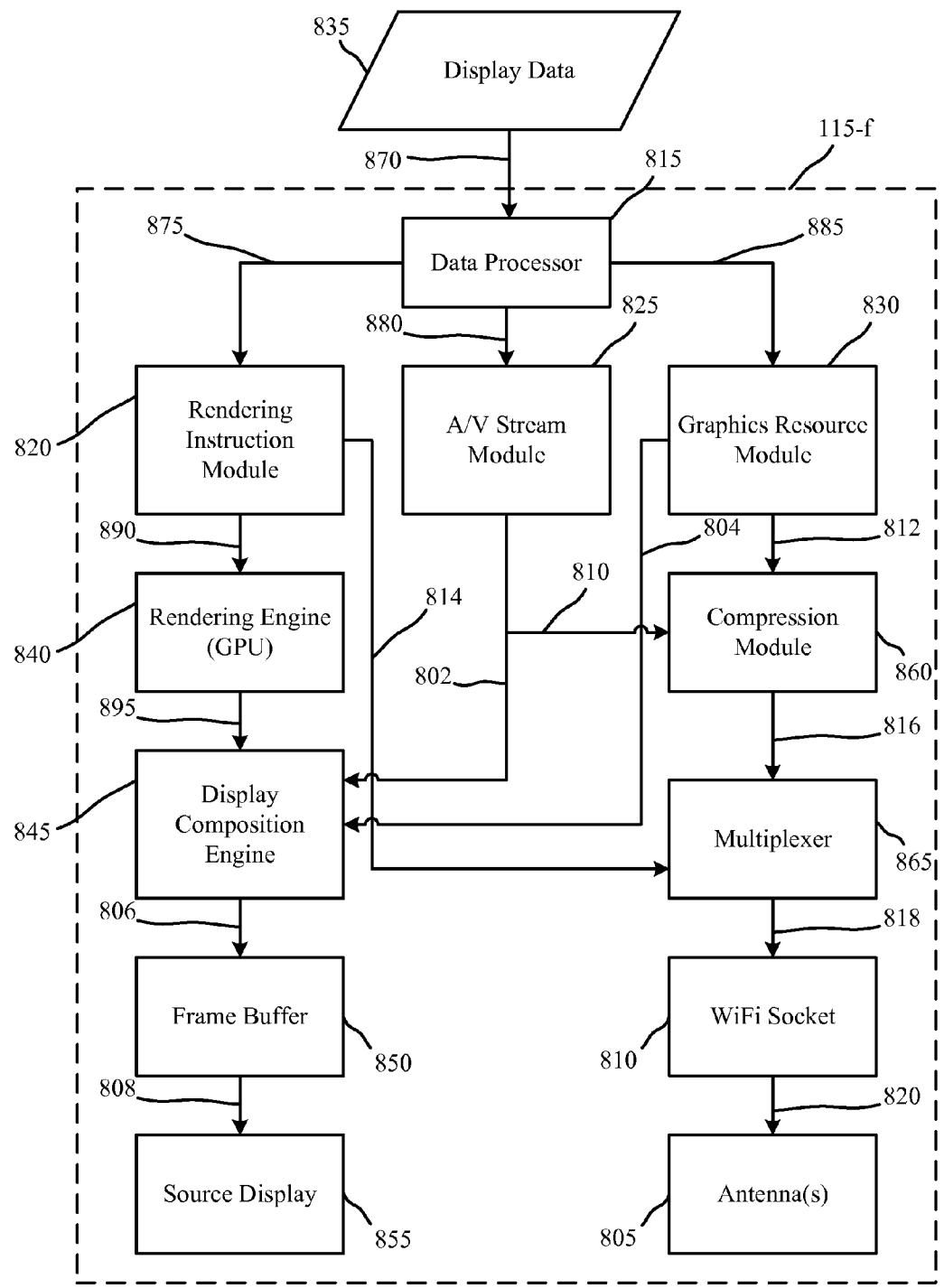
FIG. 8 is a block diagram of one embodiment of a source device.

FIG. 8 is a block diagram 800 of a source device 115-*f*. This may be the source device 115 of FIGS. 1, 4, 5, 6 and/or 7. The source device 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The source device 115-*f* may have an internal power supply (not shown), such as a small battery, to facilitate mobile operation.

The source device 115-*f* may include antennas 805, a Wi-Fi socket 810 (e.g., transceiver), a data processor 815, a rendering instruction module 820, an A/V stream module 825 and a graphics resource module 830, each of which each may be in communication, directly or indirectly, with each other (e.g., via one or more buses). The Wi-Fi socket 810 may be configured to communicate bi-directionally, via the antennas 805, as described above. For example, the Wi-Fi socket 810 may be configured to communicate bi-directionally with sink devices 105 of FIGS. 1, 2, 3 and/or 7. The Wi-Fi socket 810 may also include the source receiver module 405 and the source transmitter module 415 of FIGS. 4, 5 and/or 6, as previously described. The Wi-Fi socket 810 may include a modem configured to modulate packets and provide the modulated packets to the antennas 805 for transmission, and to demodulate packets received from the antennas 805. While the source device 115-*f* may include a single antenna, the source device 115-*f* will typically include multiple antennas 805 for multiple links.

The data processor 815 may include an intelligent hardware device, e.g., a central processing unit (CPU), a microcontroller, an application specific integrated circuit (ASIC), etc. The data processor 815 may include a speech encoder (not shown) configured to receive audio via a microphone, convert the audio into packets (e.g., 30 ms in length) representative of the received audio, provide the audio packets to the Wi-Fi socket 810, and provide indications of whether a user is speaking. Alternatively, an encoder may only provide packets to the Wi-Fi socket 810, with the provision or withholding/suppression of the packet itself providing the indication of whether a user is speaking.

As illustrated in FIG. 8, the data processor 815 may receive display data 835 from an outside source (e.g., the Internet) via one or more signals 870. Alternatively or additionally, the data processor 815 may receive display data from the source device 115-*f* (e.g., an operating system, an application, etc.). The data processor 815 may process the received display data 835 to obtain one or more rendering instructions, one or more audio and/or video streams and one or more graphics resources. The rendering instruction(s), the audio and/or video stream(s) and the graphics resource(s) may be provided to the rendering instruction module 820 via one or more signals 875, the A/V stream module 825 via one or more signals 880 and the graphics resource module 830 via one or more signals 885, respectively. The rendering instruction module 820, the A/V stream module 825 and the graphics resource module 830 may process the respective data as described herein.

According to the architecture of FIG. 8, the source device 115-*f* further may include a rendering engine or graphics processing unit (GPU) 840, a display composition engine 845, a frame buffer 850 and a source display 855. The rendering engine/GPU 840 may render content for display using the rendering instruction(s) received from the rendering instruction module 820 via one or more signals 890. The display composition engine 845 may combine the rendered content received from the GPU 840 via one or more signals 895 with the video stream(s) received from the A/V stream module 825 via one or more signals 802 and with the graphics resource(s) received from the graphics resource module 830 via one or more signals 804. This combined content may be provided to the frame buffer 850 via one or more signals 806, which may send the content via one or more signals 808 to the source display 855 for display.

The source device 115-*f* further may include a compression module 860 (and/or a coding module, not shown) for processing (e.g., compressing and/or encoding) the video stream(s) received from the A/V stream module 825, via one or more signals 810, and the graphics resource(s) received from the graphics resource module 830, via one or more signals 812, for transmission. The source device 115-*f* also may include a multiplexer 865 for combining the rendering instruction(s) received from the rendering instruction module 820 via one or more signals 814 with the processed video stream(s) and/or graphics resource(s), received via one or more signals 816. The multiplexer 865 may provide the combined data to the Wi-Fi socket 810 via one or more signals 818, which may send the data via one or more signals 820 to the antennas 805 for transmission to the sink device(s).

The components of the source device 115-*f* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the source device 115-*f*.

Figure 9:
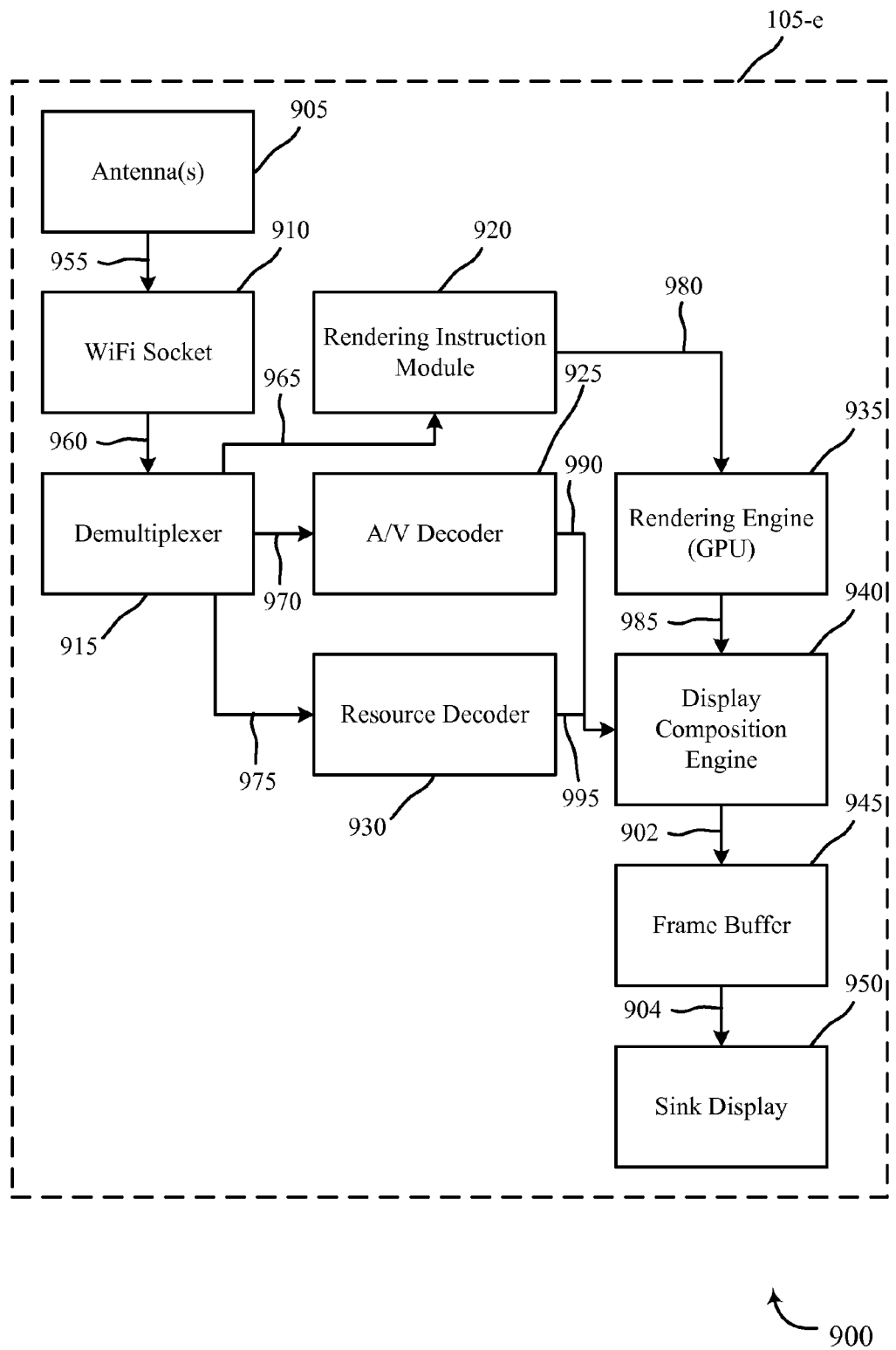
FIG. 9 is a block diagram of one embodiment of a sink device.

FIG. 9 is a block diagram 900 of a sink device 105-*e*. This may be the sink device 105 of FIGS. 1, 2, 3 and/or 7. The sink device 105-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The sink device 105-*e* may have an internal power supply (not shown), such as a small battery, to facilitate mobile operation.

The sink device 105-*e* may include antennas 905, a Wi-Fi socket 910 (e.g., transceiver), a demultiplexer 915, a rendering instruction module 920, an A/V decoder 925 and a resource decoder 930, each of which each may be in communication, directly or indirectly, with each other (e.g., via one or more buses). The Wi-Fi socket 910 may be configured to communicate bi-directionally, via the antennas 905, as described above. For example, the Wi-Fi socket 910 may be configured to communicate bi-directionally with source devices 115 of FIGS. 1, 4, 5, 6 and/or 7. The Wi-Fi socket 910 may also include the sink receiver module 205 and the sink transmitter module 215 of FIGS. 2 and/or 3, as previously described. The Wi-Fi socket 910 may include a modem configured to modulate packets and provide the modulated packets to the antennas 905 for transmission, and to demodulate packets received from the antennas 905. While the sink device 105-*e* may include a single antenna, the sink device 105-*e* will typically include multiple antennas 905 for multiple links.

The antenna(s) 905 may receive data from the source device(s) 115 and provide the received data to the WiFi socket 910 via one or more signals 955. The WiFi socket 910 in turn may provide the data to the demultiplexer 915 via one or more signals 960. The demultiplexer 915 may separate (e.g., demultiplex) data received from the source device(s) 115 into one or more rendering instructions, one or more audio and/or video streams and one or more graphics resources. The rendering instruction(s), the audio and/or video stream(s) and the graphics resource(s) may be provided to the rendering instruction module 920 via one or more signals 965, the A/V decoder 925 via one or more signals 970, and the resource decoder 930 via one or more signals 975, respectively. The rendering instruction module 920, the A/V decoder 925 and the resource decoder 930 may process (e.g., decode, decompress, etc.) the respective data as described herein.

According to the architecture of FIG. 9, the sink device 105-*e* further may include a rendering engine or graphics processing unit (GPU) 935, a display composition engine 940, a frame buffer 945 and a sink display 950. The rendering engine/GPU 935 may render content for display using the rendering instruction(s) received from the rendering instruction module 920 via one or more signals 980. The display composition engine 940 may combine the rendered content, received from the GPU 935 via one or more signals 985, with video stream(s) received from the A/V decoder 925 via one or more signals 990 and with the graphics resource(s) received from the resource decoder 930 via one or more signals 995. This combined content may be provided to the frame buffer 945 via one or more signals 902, which may send the content via one or more signals 904 to the sink display 950 for display.

Although not shown, the sink device 105-*e* may include one or more input devices for receiving user input at the sink device 105-*e*. The sink device 105-*e* may use the receiver user input to generate data for transmission to the source device(s) as described herein.

The components of the sink device 105-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the sink device 105-*e*.

Figure 10:
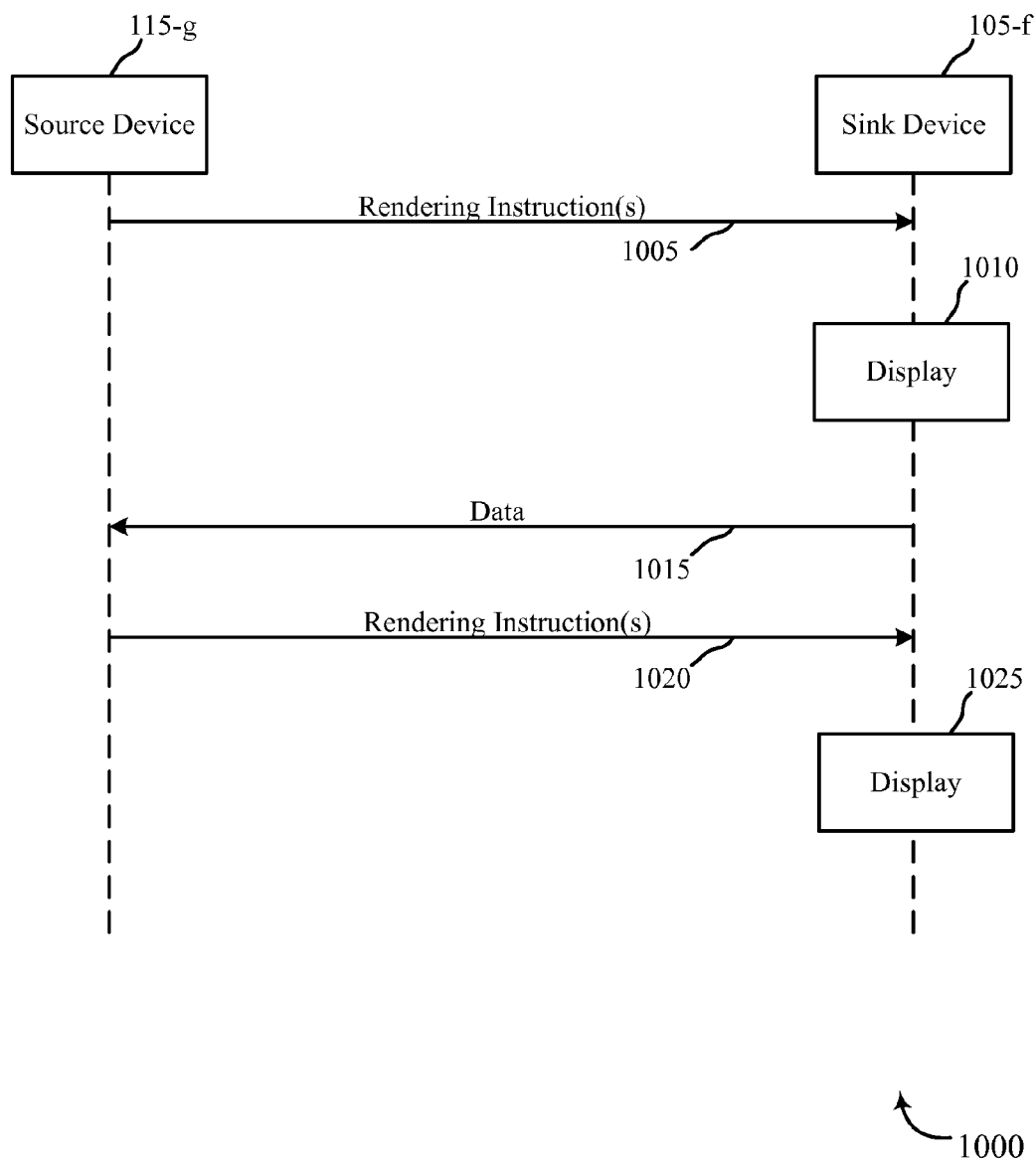
FIG. 10 is a message flow diagram illustrating a flow of communications between a source device and a sink device in accordance with various embodiments.

FIG. 10 is a message flow diagram 1000 illustrating one example of communications between a source device 115-*g* and a sink device 105-*f*. The source device 115-*g* may be an example of the devices 115 of FIGS. 1, 4, 5, 6, 7 and/or 8. The sink device 105-*f* may be an example of the sink devices 105 illustrated in FIGS. 1, 2, 3, 4, 7 and/or 9.

In one configuration, the source device 115-*g* and the sink device 105-*f* may be connected via a Wi-Fi peer-to-peer connection. The source device 115-*g* may send one or more rendering instructions 1005 to the sink device 105-*f*. The sink device 105-*f* may render a display 1010 of content using the received rendering instruction(s).

The sink device 105-*f* may send data 1015 to the source device 115-*g*. The source device 115-*g* may send updated or new rendering instruction(s) 1020 determined by the source device 115-*g* using the received data 1015. The sink device 105-*f* may then render a display 1025 of content using the received updated/new rendering instruction(s) 1020. While the message flow diagram 1000 is described with respect to rendering instructions, it should be understood that one or more video streams and/or one or more graphics resources may be included with, or in place of, rendering instructions.

Figure 11:
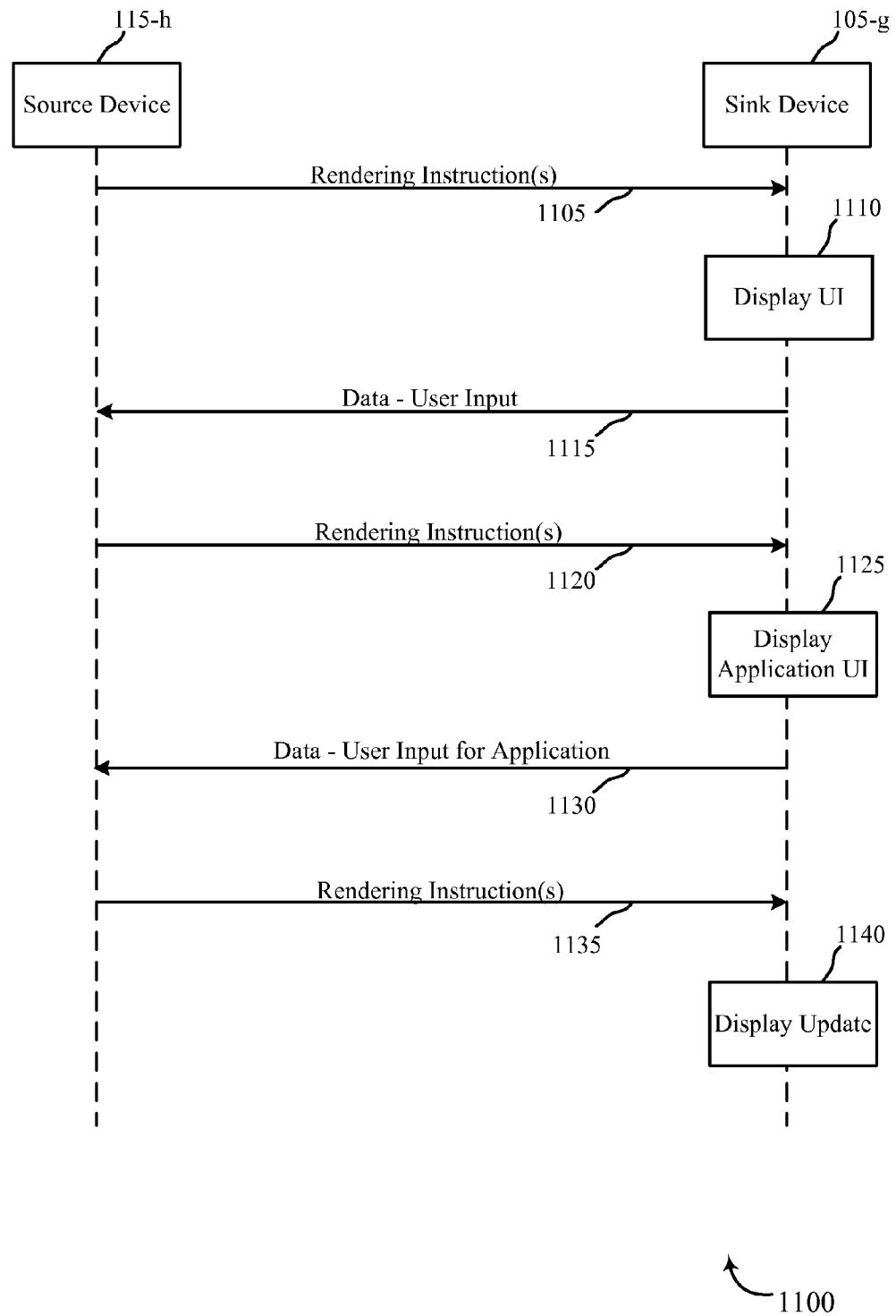
FIG. 11 is a message flow diagram illustrating another flow of communications between a source device and a sink device in accordance with various embodiments.

FIG. 11 is a message flow diagram 1100 illustrating one example of communications between a source device 115-*h* and a sink device 105-*g*. The source device 115-*h* may be an example of the devices 115 of FIGS. 1, 4, 5, 6, 7, 8 and/or 10. The sink device 105-*g* may be an example of the sink devices 105 illustrated in 1, 2, 3, 4, 7, 9 and/or 10.

In one configuration, the source device 115-*h* and the sink device 105-*g* may be connected via a Wi-Fi peer-to-peer connection. The source device 115-*h* may send one or more rendering instructions 1105 to the sink device 105-*f*. The sink device 105-*f* may render a display 1110 of a user interface (UI) of the source device 115-*h* using the received rendering instruction(s).

The sink device 105-*f* may send, to the source device 115-*h*, data 1115 corresponding to user input received at the sink device 105-*g* in accordance with the display 1110. The source device 115-*h* may send updated or new rendering instruction(s) 1120 determined by the source device 115-*h* using the received data 1115. For example, the received data 1115 may include instructions to launch an application on the source device 115-*h*. In such an instance, the updated or new rendering instruction(s) 1120 may be determined by the source device 115-*h* to be for rendering a display of a UI of the launched application. The sink device 105-*g* may then render a display 1125 of a user interface (UI) of the application running on the source device 115-*h* using the received updated/new rendering instruction(s) 1120.

The sink device 105-*f* may send, to the source device 115-*h*, data 1130 corresponding to user input received at the sink device 105-*g* in accordance with the display 1125. The source device 115-*h* may send updated or new rendering instruction(s) 1135 determined by the source device 115-*h* using the received data 1130. For example, the received data 1115 may include instructions for controlling the application running on the source device 115-*h*. In such an instance, the updated or new rendering instruction(s) 1135 may be determined by the source device 115-*h* to be for rendering an updated display of the application UI or a display corresponding to the control instructions executed by the running application. The sink device 105-*g* may then render a display 1140 updated using the received updated/new rendering instruction(s) 1135. Again, while the message flow diagram 1100 is described with respect to rendering instructions, it should be understood that one or more video streams and/or one or more graphics resources may be included with, or in place of, rendering instructions.

Figure 12:
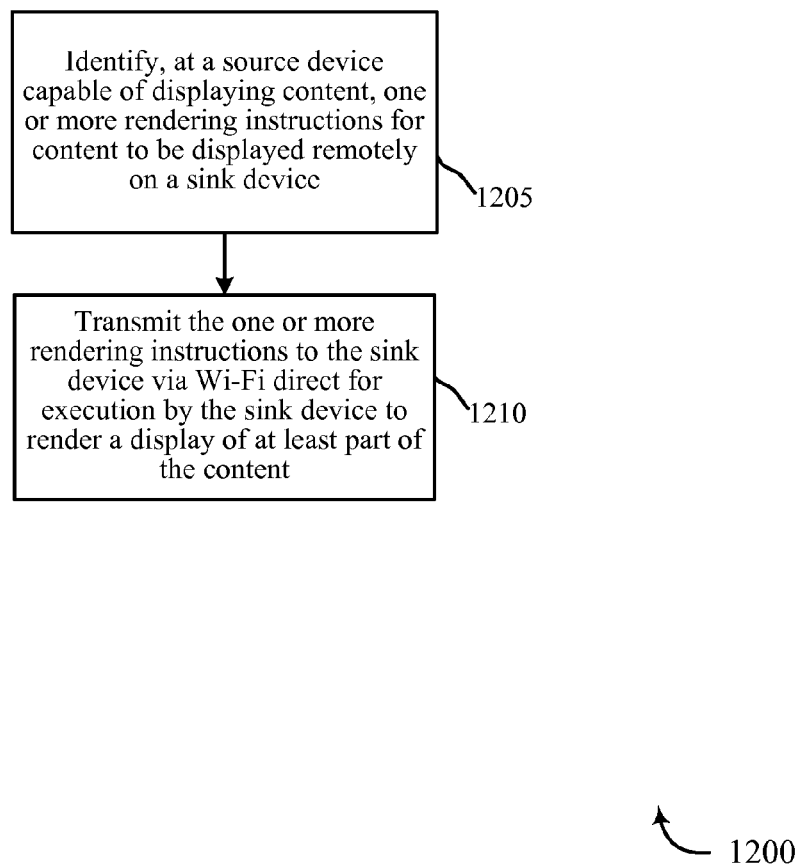
FIG. 12 is a flow chart illustrating an embodiment of a method performed by a source device for remote display of content by a sink device.

FIG. 12 is a flow chart illustrating an embodiment of a method 1200 performed by a source device for remote display of content by a sink device. For clarity, the method 1200 is described below with reference to the wireless communications system 100 shown in FIG. 1, and/or with reference to one of the source devices 115 described with reference to FIGS. 1, 4, 5, 6, 7, 8, 10 and/or 11. In one implementation, the communications management module 410 described with reference to FIGS. 4, 5, 6 and/or 7 may execute one or more sets of codes to control the functional elements of a source device 115 to perform the functions described below.

In one embodiment, at block 1205, the source device 115 may identify one or more rendering instructions for content to be displayed remotely on a sink device 105. At block 1210, the rendering instruction(s) may be transmitted from the source device 115 to the sink device 105 via Wi-Fi direct, e.g., via a Wi-Fi peer-to-peer connection.

Therefore, the method 1200 may be used to provide rendering instructions to a sink device 105 via Wi-Fi direct such that the sink device 105 may render content using the rendering instructions. Thus, the source device 115 does not need to send rendered content to the sink device 105 and may use wireless bandwidth more efficiently. It should be noted that the method 1200 is just one implementation and that other implementations are possible.

Figure 13:
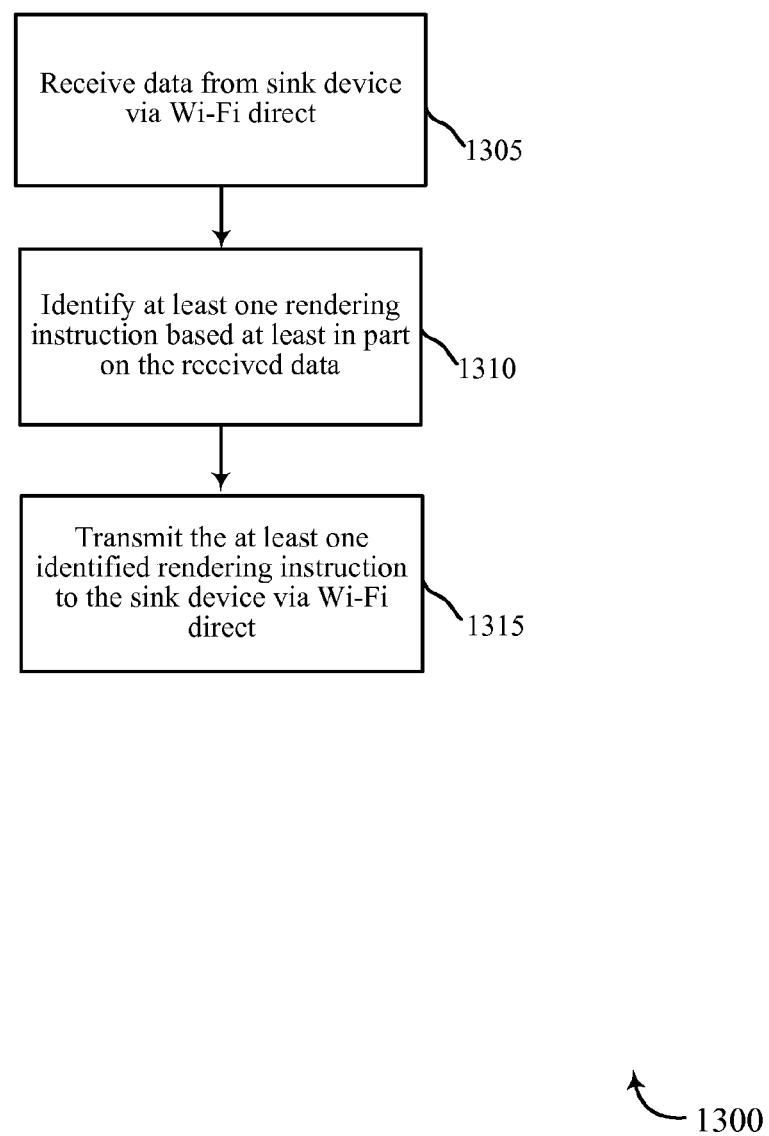
FIG. 13 is a flow chart illustrating another embodiment of a method performed by a source device for remote display of content by a sink device.

FIG. 13 is a flow chart illustrating another embodiment of a method 1300 performed by a source device for remote display of content by a sink device. For clarity, the method 1300 is described below with reference to the wireless communications system 100 shown in FIG. 1, and/or with reference to one of the source devices 115 described with reference to FIGS. 1, 4, 5, 6, 7, 8, 10 and/or 11. In one implementation, the communications management module 410 described with reference to FIGS. 4, 5, 6 and/or 7 may execute one or more sets of codes to control the functional elements of a source device 115 to perform the functions described below.

At block 1305, a source device 115 may receive data from a sink device 105 via Wi-Fi direct, e.g., via a Wi-Fi peer-to-peer connection. At block 1310, the source device 115 may identify at least one rendering instruction using the received data. At block 1315, the rendering instruction(s) may be transmitted from the source device 115 to the sink device 105 via Wi-Fi direct.

Therefore, the method 1300 may be used to obtain updated rendering instructions from a source device for a sink device to update its display of content based at least in part on data from the sink device. It should be noted that the method 1300 is just one implementation and that other implementations are possible. For example, the operations of the method 1300 may be combined with the operations of the method 1200 described with respect to FIG. 12. Further, the operations may be rearranged and/or modified as appropriate or desired.

Figure 14:
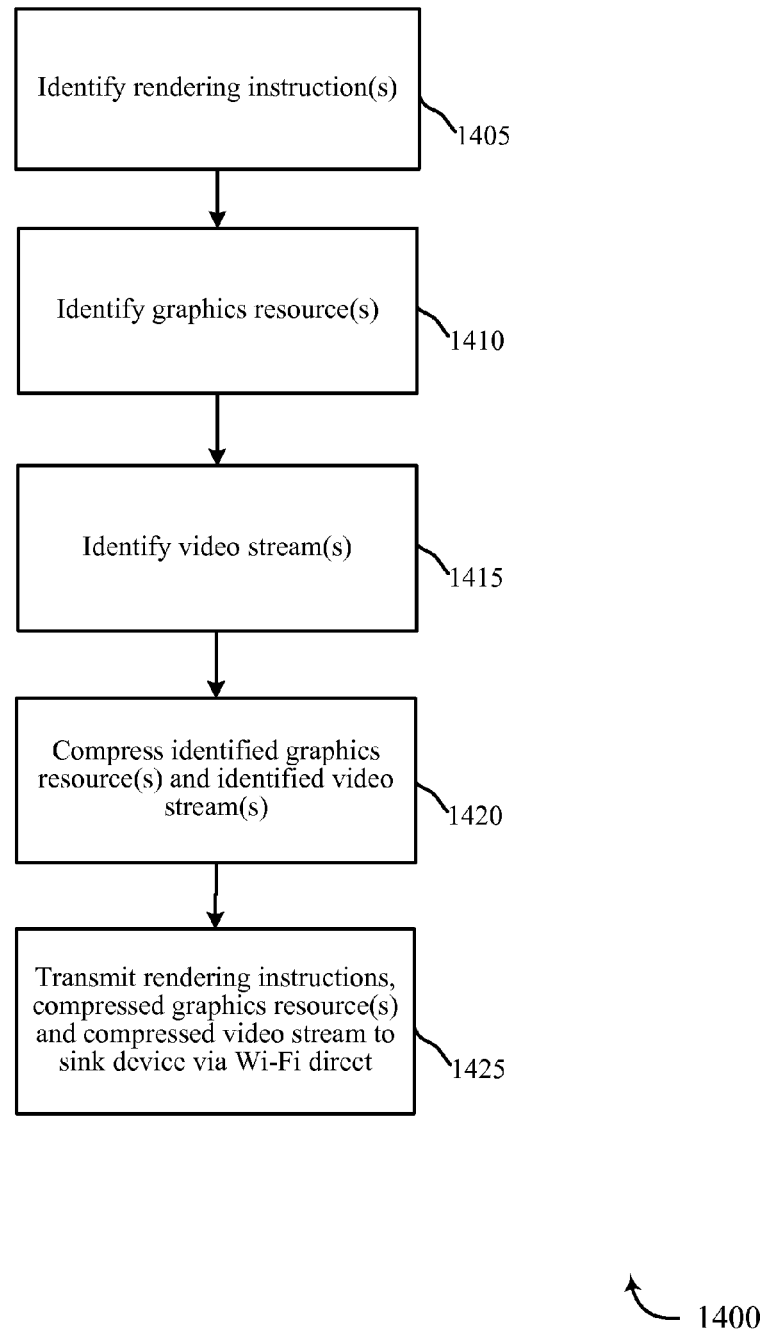
FIG. 14 is a flow chart illustrating a further embodiment of a method performed by a source device for remote display of content by a sink device.

FIG. 14 is a flow chart illustrating a further embodiment of a method 1400 performed by a source device for remote display of content by a sink device. For clarity, the method 1400 is described below with reference to the wireless communications system 100 shown in FIG. 1, and/or with reference to one of the source devices 115 described with reference to FIGS. 1, 4, 5, 6, 7, 8, 10 and/or 11. In one implementation, the communications management module 410 described with reference to FIGS. 4, 5, 6 and/or 7 may execute one or more sets of codes to control the functional elements of a source device 115 to perform the functions described below.

At block 1405, the source device 115 may identify one or more rendering instructions for content to be displayed remotely on a sink device 105. At block 1410, the source device 115 may identify one or more graphics resources for content to be displayed remotely on the sink device 105. At block 1415, the source device 115 may identify one or more video streams to be displayed remotely on a sink device 105. Next, at block 1420, the identified graphics resource(s) and the identified video stream(s) may be compressed (or encoded). Then at block 1425, the rendering instruction(s), the compressed graphics resource(s) and the compressed video stream(s) may be transmitted from the source device 115 to the sink device 105 via Wi-Fi direct, e.g., via a Wi-Fi peer-to-peer connection.

Therefore, the method 1400 may be used to provide rendering instructions, graphics resources and video streams to a sink device 105 via Wi-Fi direct such that the sink device 105 may render content. Thus, the source device 115 does not need to send rendered content to the sink device 105 and may use wireless bandwidth more efficiently. It should be noted that the method 1400 is just one implementation and that other implementations are possible. For example, the operations of the method 1400 may be combined with the operations of the method 1200 described with respect to FIG. 12 and/or the operations of the method 1300 described with respect to FIG. 13. Further, the operations may be rearranged and/or modified as appropriate or desired.

Figure 15:
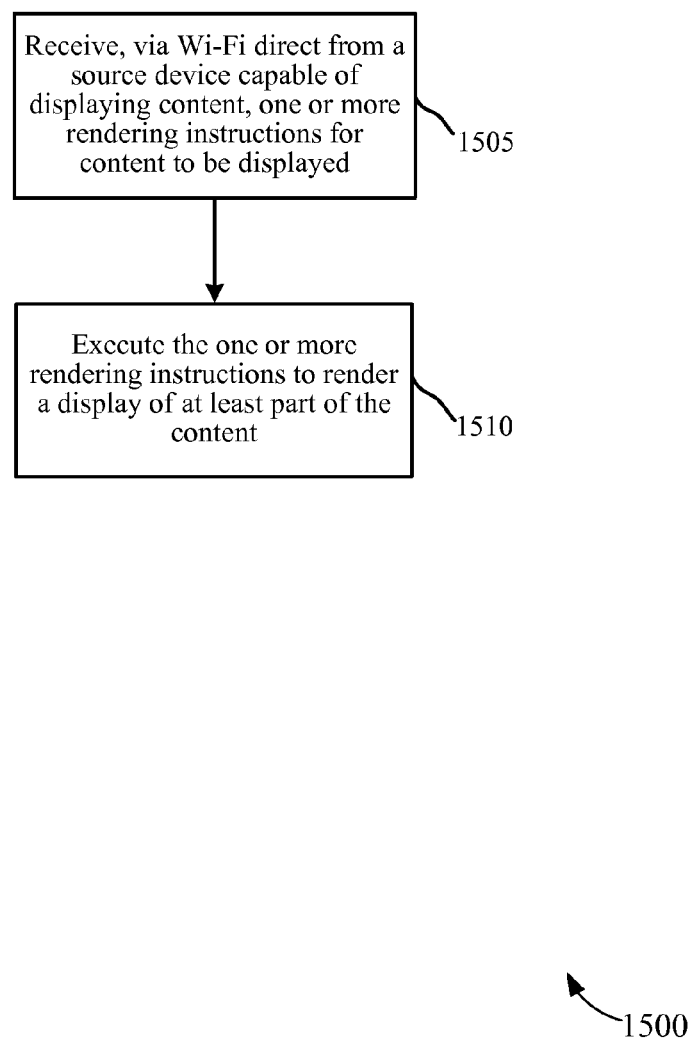
FIG. 15 is a flow chart illustrating an embodiment of a method performed by a sink device for remote display of content of a source device.

FIG. 15 is a flow chart illustrating an embodiment of a method 1500 performed by a sink device for remote display of content of a source device. For clarity, the method 1500 is described below with reference to the wireless communications system 100 shown in FIG. 1, and/or with reference to one of the sink devices 105 described with reference to FIGS. 1, 2, 3, 7, 9, 10 and/or 11. In one implementation, the rendering management module 210 described with reference to FIGS. 2, 3 and/or 7 may execute one or more sets of codes to control the functional elements of a sink device 105 to perform the functions described below.

In one embodiment, at block 1505, the sink device 105 may receive, via Wi-Fi direct (e.g., via a Wi-Fi peer-to-peer connection) from a source device 115, one or more rendering instructions for content to be displayed remotely on the sink device 105. Then, at block 1510, the sink device 105 may execute the received rendering instruction(s) to render a display of the content at the sink device 105.

Therefore, the method 1500 may be used to display content of a source device remotely on a sink device 105 via Wi-Fi direct such that the sink device 105 may render the content using the rendering instructions. Thus, the sink device 105 does not need to receive rendered content from the source device 115 and may use wireless bandwidth more efficiently. It should be noted that the method 1500 is just one implementation and that other implementations are possible.

Figure 16:
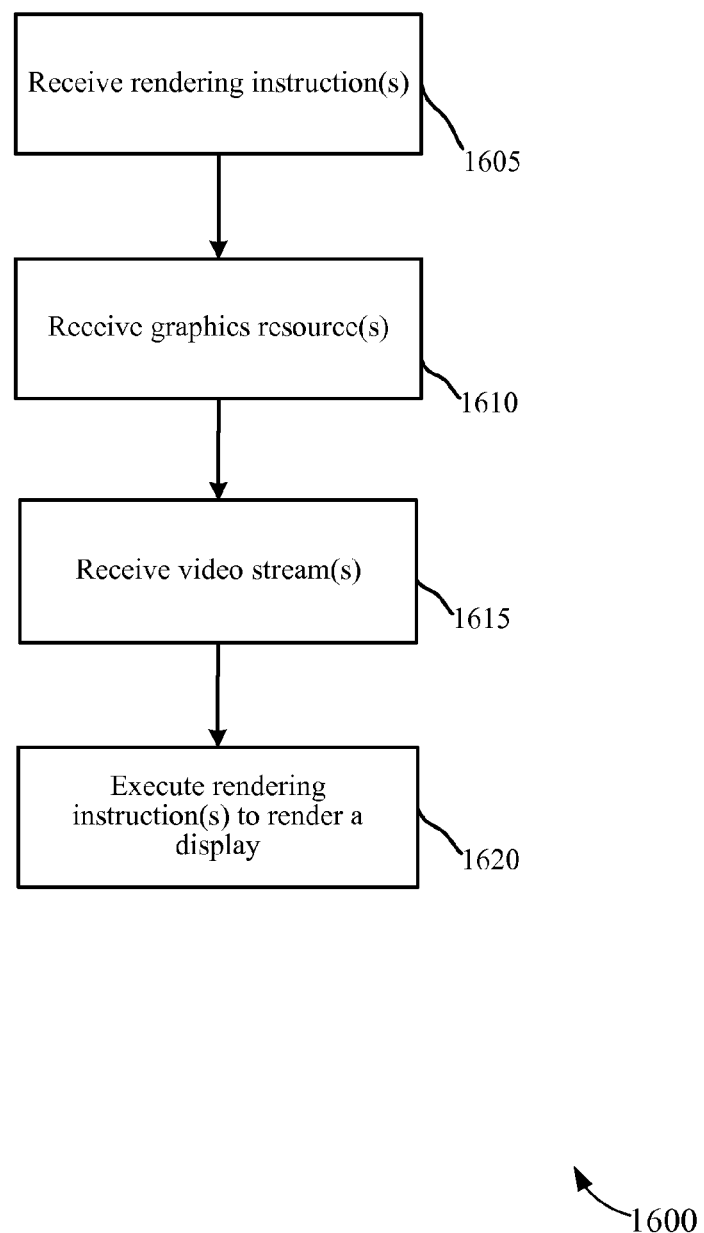
FIG. 16 is a flow chart illustrating another embodiment of a method performed by a sink device for remote display of content of a source device.

FIG. 16 is a flow chart illustrating another embodiment of a method 1600 performed by a sink device for remote display of content of a source device. For clarity, the method 1600 is described below with reference to the wireless communications system 100 shown in FIG. 1, and/or with reference to one of the sink devices 105 described with reference to FIGS. 1, 2, 3, 7, 9, 10 and/or 11. In one implementation, the rendering management module 210 described with reference to FIGS. 2, 3 and/or 7 may execute one or more sets of codes to control the functional elements of a sink device 105 to perform the functions described below.

In one embodiment, at block 1605, the sink device 105 may receive, via Wi-Fi direct (e.g., via a Wi-Fi peer-to-peer connection) from a source device 115, one or more rendering instructions for content to be displayed remotely on the sink device 105. At block 1610, the sink device 105 may receive one or more graphics resources from the source device 115 via Wi-Fi direct. At block 1615, the sink device 105 may receive one or more video streams from the source device 115 via Wi-Fi direct. Then, at block 1620, the sink device 105 may execute the received rendering instruction(s) to render a display at the sink device 105. Executing the received rendering instructions may cause the received graphics resource(s) and/or the received video stream(s) to be included in the rendered display. Alternatively or additionally, the received graphics resource(s) and/or the received video stream(s) may be combined with the display resulting from the rendering instruction(s).

Therefore, the method 1600 may be used to display content of a source device remotely on a sink device 105 via Wi-Fi direct such that the sink device 105 may render the content using the rendering instructions. Thus, the sink device 105 does not need to receive rendered content from the source device 115 and may use wireless bandwidth more efficiently. It should be noted that the method 1600 is just one implementation and that other implementations are possible. For example, the operations of the method 1600 may be rearranged and/or modified as appropriate or desired.

Figure 17:
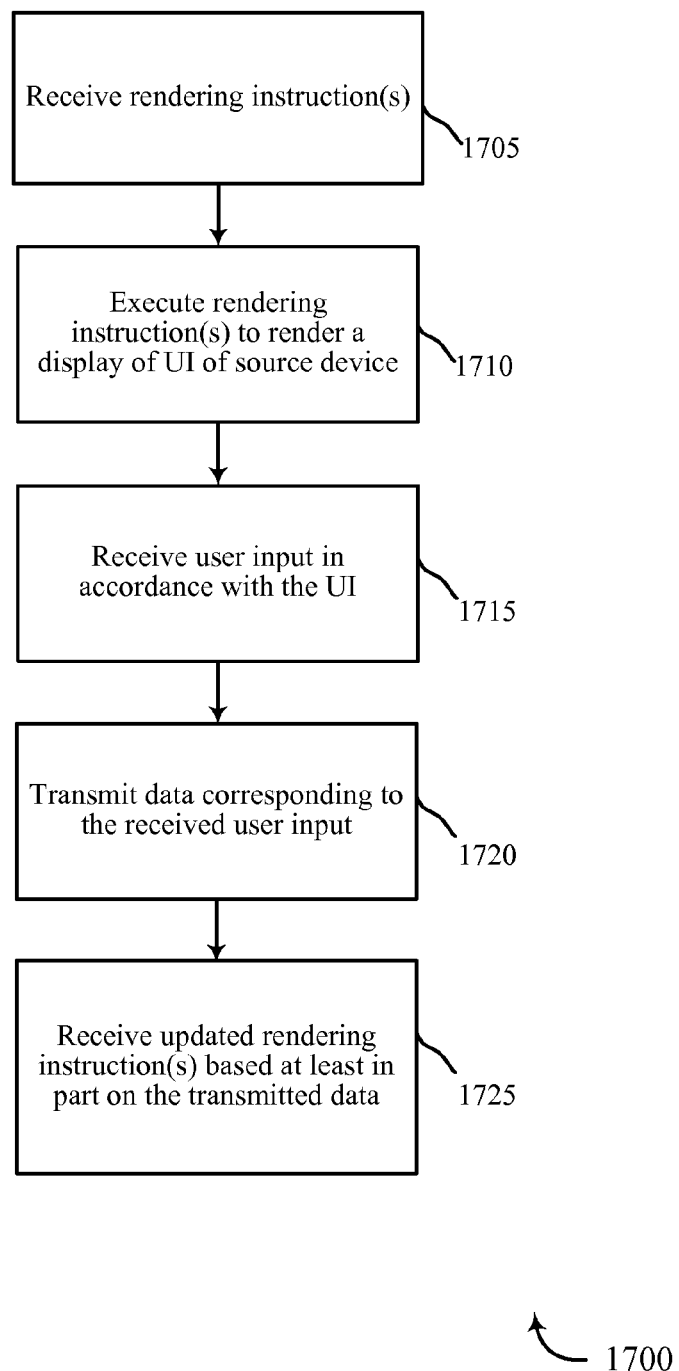
FIG. 17 is a flow chart illustrating a further embodiment of a method performed by a sink device for remote display of content of a source device.

FIG. 17 is a flow chart illustrating a further embodiment of a method 1700 performed by a sink device for remotely displaying content of a source device. For clarity, the method 1700 is described below with reference to the wireless communications system 100 shown in FIG. 1, and/or with reference to one of the sink devices 105 described with reference to FIGS. 1, 2, 3, 7, 9, 10 and/or 11. In one implementation, the rendering management module 210 described with reference to FIGS. 2, 3 and/or 7 may execute one or more sets of codes to control the functional elements of a sink device 105 to perform the functions described below.

At block 1705, the sink device 105 may receive, via Wi-Fi direct (e.g., via a Wi-Fi peer-to-peer connection) from a source device 115, one or more rendering instructions for content to be displayed remotely on the sink device 105. At block 1710, the sink device 105 may execute the received rendering instruction(s) to render a display of at least part of a user interface (UI) of the source device 115 at the sink device 105.

At block 1715, the sink device 105 may receive user input in accordance with the displayed UI. Next, at block 1720, the sink device 105 may transmit, via Wi-Fi direct to the source device 115, data corresponding to the received user input. Then, at block 1725, the sink device 105 may receive, via Wi-Fi direct from a source device 115, one or more updated rendering instructions for content to be displayed remotely on the sink device 105, the rendering instruction(s) being updated by the source device 115 using the data transmitted to the source device 115.

Therefore, the method 1700 may be used to display a UI of a source device remotely on a sink device 105 via Wi-Fi direct such that the sink device 105 may render the UI using the rendering instructions. Further, the method 1700 may be used to update the rendering instructions using data corresponding to user input received at the sink device 105. It should be noted that the method 1700 is just one implementation and that other implementations are possible. For example, the operations of the method 1700 may be combined with the operations of the method 1500 described with respect to FIG. 15 and/or the operations of the method 1600 described above with respect to FIG. 16. Further, the operations may be rearranged and/or modified as appropriate or desired.

Figure 18:
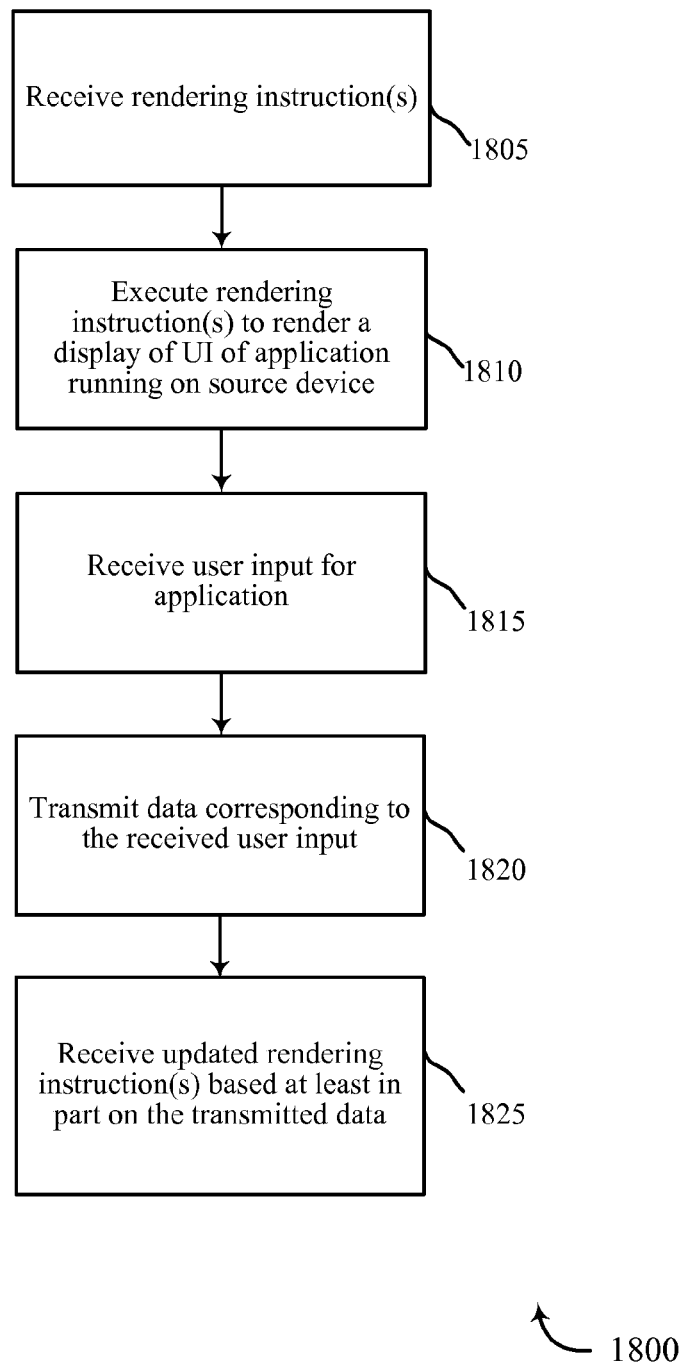
FIG. 18 is a flow chart illustrating yet another embodiment of a method performed by a sink device for remote display of content of a source device.

FIG. 18 is a flow chart illustrating a yet another embodiment of a method 1800 performed by a sink device for remotely displaying content of a source device. For clarity, the method 1800 is described below with reference to the wireless communications system 100 shown in FIG. 1, and/or with reference to one of the sink devices 105 described with reference to FIGS. 1, 2, 3, 7, 9, 10 and/or 11. In one implementation, the rendering management module 210 described with reference to FIGS. 2, 3 and/or 7 may execute one or more sets of codes to control the functional elements of a sink device 105 to perform the functions described below.

At block 1805, the sink device 105 may receive, via Wi-Fi direct (e.g., via a Wi-Fi peer-to-peer connection) from a source device 115, one or more rendering instructions for content to be displayed remotely on the sink device 105. At block 1810, the sink device 105 may execute the received rendering instruction(s) to render a display at the sink device 105 of at least part of a user interface (UI) of an application running on the source device 115.

At block 1815, the sink device 105 may receive user input for the application in accordance with the displayed UI of the application. Next, at block 1820, the sink device 105 may transmit, via Wi-Fi direct to the source device 115, data corresponding to the received user input. Then, at block 1825, the sink device 105 may receive, via Wi-Fi direct from a source device 115, one or more updated rendering instructions for content to be displayed remotely on the sink device 105, the rendering instruction(s) being updated by the source device 115 using the data transmitted to the source device 115.

Therefore, the method 1800 may be used to display a UI of an application running on a source device remotely on a sink device 105 via Wi-Fi direct such that the sink device 105 may render the UI using the rendering instructions. Further, the method 1800 may be used to update the rendering instructions using data corresponding to user input for the application received at the sink device 105. It should be noted that the method 1800 is just one implementation and that other implementations are possible. For example, the operations of the method 1800 may be combined with the operations of the method 1500 described with respect to FIG. 15, the operations of the method 1600 described above with respect to FIG. 16, and/or the operations of the method 1700 described above with respect to FIG. 17. Further, the operations may be rearranged and/or modified as appropriate or desired.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method performed by a source device of content to be displayed by a sink device in a wireless network, comprising:
identifying, at a source device, one or more rendering instructions for content to be displayed on a remotely located sink device; and
transmitting the one or more rendering instructions to the sink device via a wireless peer-to-peer connection for execution by the sink device to render a display of at least part of the content based at least in part on the rendering instructions.

2. The method of claim 1, further comprising:
receiving data at the source device from the sink device via the wireless peer-to-peer connection, the identifying of the one or more rendering instructions comprising identifying at least one rendering instruction based at least in part on the received data.

3. The method of claim 2, wherein at least part of the received data corresponds to user input at the sink device.

4. The method of claim 1, further comprising:
running an application on the source device, at least one of the one or more rendering instructions being configured to render at least part of a user interface of the application upon execution.

5. The method of claim 4, further comprising:
receiving data at the source device from the sink device via the wireless peer-to-peer connection, the identifying of the one or more rendering instructions comprising identifying at least one rendering instruction based at least in part on the received data, at least part of the received data corresponding to user input for the application at the sink device.

6. The method of claim 1, wherein at least one of the one or more rendering instructions is configured to render at least part of a user interface of the source device upon execution.

7. The method of claim 6, further comprising:
receiving data at the source device from the sink device via the wireless peer-to-peer connection, the identifying of the one or more rendering instructions comprising identifying at least one rendering instruction based at least in part on the received data, at least part of the received data corresponding to user input at the sink device in accordance with the user interface of the source device.

8. The method of claim 1, further comprising:
identifying at least one graphics resource in the content;
compressing the at least one graphics resource; and
transmitting the compressed at least one graphics resource to the sink device, at least one of the one or more rendering instructions being configured to include the at least one graphics resource in the content displayed upon execution.

9. The method of claim 1, further comprising:
identifying at least one video stream in the content;
compressing the at least one video stream; and
transmitting the compressed at least one video stream to the sink device, at least one of the one or more rendering instructions being configured to include the at least one video stream in the content displayed upon execution.

10. An apparatus configured to enable display of content by a sink device in a wireless network, comprising:
means for identifying, at a source device, one or more rendering instructions for content to be displayed on a remotely located sink device; and
means for transmitting the one or more rendering instructions to the sink device via a wireless peer-to-peer connection for execution by the sink device to render a display of at least part of the content based at least in part on the rendering instructions.

11. The apparatus of claim 10, further comprising:
means for receiving data at the source device from the sink device via the wireless peer-to-peer connection, the means for identifying the one or more rendering instructions comprising means for identifying at least one rendering instruction based at least in part on the received data.

12. The apparatus of claim 11, wherein at least part of the received data corresponds to user input at the sink device.

13. The apparatus of claim 10, further comprising:
means for running an application on the source device, at least one of the one or more rendering instructions being configured to render at least part of a user interface of the application upon execution.

14. The apparatus of claim 13, further comprising:
means for receiving data at the source device from the sink device via the wireless peer-to-peer connection, the means for identifying the one or more rendering instructions comprising means for identifying at least one rendering instruction based at least in part on the received data, at least part of the received data corresponding to user input for the application at the sink device.

15. The apparatus of claim 10, wherein at least one of the one or more rendering instructions is configured to render at least part of a user interface of the source device upon execution.

16. The apparatus of claim 15, further comprising:
means for receiving data at the source device from the sink device via the wireless peer-to-peer connection, the means for identifying the one or more rendering instructions comprising means for identifying at least one rendering instruction based at least in part on the received data, at least part of the received data corresponding to user input at the sink device in accordance with the user interface of the source device.

17. The apparatus of claim 10, further comprising:
means for identifying at least one graphics resource in the content;
means for compressing the at least one graphics resource; and
means for transmitting the compressed at least one graphics resource to the sink device, at least one of the one or more rendering instructions being configured to include the at least one graphics resource in the content displayed upon execution.

18. The apparatus of claim 10, further comprising:
means for identifying at least one video stream in the content;
means for compressing the at least one video stream; and
means for transmitting the compressed at least one video stream to the sink device, at least one of the one or more rendering instructions being configured to include the at least one video stream in the content displayed upon execution.

19. A source device for display of content by a remotely located sink device in a wireless network, comprising:
a processor;
memory in electronic communication with the processor; and
instructions being stored in the memory, the instructions being executable by the processor to:
identify, at the source device, one or more rendering instructions for content to be displayed on the remotely located sink device; and
transmit the one or more rendering instructions to the sink device via a wireless peer-to-peer connection for execution by the sink device to render a display of at least part of the content based at least in part on the rendering instructions.

20. The source device of claim 19, wherein the instructions are executable by the processor to:
receive data at the source device from the sink device via the wireless peer-to-peer connection; and
identify at least one of the one or more rendering instructions based at least in part on the received data.

21. The source device of claim 20, wherein at least part of the received data corresponds to user input at the sink device.

22. The source device of claim 19, wherein the instructions are executable by the processor to:
run an application on the source device, at least one of the one or more rendering instructions being configured to render at least part of a user interface of the application upon execution.

23. The source device of claim 22, wherein the instructions are executable by the processor to:
receive data at the source device from the sink device via the wireless peer-to-peer connection; and
identify at least one of the one or more rendering instructions based at least in part on the received data, at least part of the received data corresponding to user input for the application at the sink device.

24. The source device of claim 19, wherein at least one of the one or more rendering instructions is configured to render at least part of a user interface of the source device upon execution.

25. The source device of claim 24, wherein the instructions are executable by the processor to:
receive data at the source device from the sink device via the wireless peer-to-peer connection; and
identify at least one of the one or more rendering instructions based at least in part on the received data, at least part of the received data corresponding to user input at the sink device in accordance with the user interface of the source device.

26. The source device of claim 19, wherein the instructions are executable by the processor to:
identify at least one graphics resource in the content;
compress the at least one graphics resource; and
transmit the compressed at least one graphics resource to the sink device, at least one of the one or more rendering instructions being configured to include the at least one graphics resource in the content displayed upon execution.

27. The source device of claim 19, wherein the instructions are executable by the processor to:
identify at least one video stream in the content;
compress the at least one video stream; and
transmit the compressed at least one video stream to the sink device, at least one of the one or more rendering instructions being configured to include the at least one video stream in the content displayed upon execution.

28. A method performed by a remotely located sink device for display of content of a source device in a wireless network, comprising:
receiving, via a wireless peer-to-peer connection direct from a source device, one or more rendering instructions for content to be displayed; and
executing the one or more rendering instructions to render a display of at least part of the content based at least in part on the rendering instructions.

29. The method of claim 28, further comprising:
transmitting data to the source device via the wireless peer-to-peer connection, at least one of the one or more rendering instructions received being based at least in part on the transmitted data.

30. The method of claim 29, further comprising:
receiving user input at the sink device, at least part of the data transmitted to the source device corresponding to the received user input.

* * * * *